(12) United States Patent
Koide

(10) Patent No.: US 11,360,596 B2
(45) Date of Patent: Jun. 14, 2022

(54) DISPLAY DEVICE

(71) Applicant: Japan Display Inc., Tokyo (JP)

(72) Inventor: Gen Koide, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/073,403

(22) Filed: Oct. 19, 2020

(65) Prior Publication Data

US 2021/0033938 A1  Feb. 4, 2021

Related U.S. Application Data

(63) Continuation of application No. PCT/JP2019/016902, filed on Apr. 19, 2019.

(30) Foreign Application Priority Data

Apr. 20, 2018 (JP) .............................. JP2018-081657

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G02F 1/134336* (2013.01); *G02F 1/136286* (2013.01); *G06F 3/041* (2013.01); *G06F 3/044* (2013.01); *G09G 3/20* (2013.01); *G09G 3/36* (2013.01)

(58) Field of Classification Search
None
See application file for complete search history.

(56) References Cited

U.S. PATENT DOCUMENTS

2017/0090630 A1\* 3/2017 Kim ........................ G06F 3/047
2017/0285814 A1 10/2017 Katsuta et al.
2018/0107317 A1 4/2018 Tanaka et al.

FOREIGN PATENT DOCUMENTS

JP 2017-187885 A 10/2017
JP 2018-63666 A 4/2018

OTHER PUBLICATIONS

International Search Report and Written Opinion dated Jul. 9, 2019 for PCT/JP2019/016902 filed on Apr. 19, 2019, 8 pages including English Translation of the International Search Report.

(Continued)

*Primary Examiner* — Stephen T. Reed
(74) *Attorney, Agent, or Firm* — Xsensus LLP

(57) ABSTRACT

According to an aspect, a display device includes a display panel provided with a display region including a plurality of pixels and with a plurality of detection electrodes. The display panel includes: a plurality of lines of first common wiring configured to transmit pixel signals to be supplied to the pixels and a detection input/output signal to be supplied to the detection electrodes; pixel signal wiring electrically coupled to the pixels; detection electrode wiring electrically coupled to the detection electrodes; a first switching circuit configured to electrically couple or uncouple the first common wiring to or from the pixel signal wiring; and a second switching circuit configured to electrically couple or uncouple the first common wiring to or from the detection electrode wiring.

9 Claims, 26 Drawing Sheets

(51) Int. Cl.
*G09G 3/20* (2006.01)
*G09G 3/36* (2006.01)
*G02F 1/1333* (2006.01)
*G02F 1/1343* (2006.01)
*G02F 1/1362* (2006.01)

(56) References Cited

OTHER PUBLICATIONS

Japanese Office Action dated Sep. 14, 2021 in corresponding Japanese Patent Application No. 2018-081657.

* cited by examiner

DISPLAY DEVICE

CROSS-REFERENCE TO RELATED APPLICATIONS

This application is a bypass continuation of PCT filing PCT/JP2019/016902, filed Apr. 19, 2019, which claims the benefit of priority from Japanese Patent Application No. 2018-081657, filed Apr. 20, 2018, the entire contents of each are incorporated herein by reference.

BACKGROUND

1. Technical Field

What is disclosed herein relates to a display device.

2. Description of the Related Art

In recent years, as a display device such as a liquid crystal display device used in, for example, a personal digital assistant (PDA), what is called a display device with a touch detection function provided with a detection device capable of detecting an external proximate object has been widely used. Such a display device with a touch detection function typically has a configuration in which the detection device is mounted on or integrated with a display region of a display panel.

There are capacitive detection devices that detect a position of the external proximate object using a change in electrostatic capacitance generated on a plurality of detection electrodes provided on a detection surface. In the display device with a touch detection function using such a capacitive detection device, increasing the detection electrodes to improve detection accuracy leads to increase in number of lines of wiring for supplying drive signals for detection to the detection electrodes, which in turn leads to a complicated wiring layout on the display panel. If a configuration is employed in which a drive circuit for performing display operation and a detection circuit for performing the detection operation are integrated into a semiconductor chip such as a driver integrated circuit (IC), the number of terminals of the semiconductor chip increases, so that the semiconductor chip may increase in size. The increase in the number of lines of the wiring coupled to the display panel may also lead to an increase in width of a coupling portion between a circuit board for mounting the driver IC and the display panel. For example, a technology has been disclosed that uses a shift register and a multiplexer to reduce the number of lines of the wiring for supplying the drive signals for detection.

In the above-described conventional technology, since the shift register needs to be provided on the display panel, a peripheral region outside the display region of the display panel may increase in width. As the number of lines of the wiring for supplying the drive signals for detection is reduced, the circuit scale of the shift register and the multiplexer increases, so that the peripheral region of the display panel may be occupied by a larger circuit area.

For the foregoing reasons, there is a need for a display device capable of reducing the number of lines of the wiring coupled to the display panel.

SUMMARY

According to an aspect, a display device includes a display panel provided with a display region including a plurality of pixels and with a plurality of detection electrodes. The display panel includes: a plurality of lines of first common wiring configured to transmit pixel signals to be supplied to the pixels and a detection input/output signal to be supplied to the detection electrodes; pixel signal wiring electrically coupled to the pixels; detection electrode wiring electrically coupled to the detection electrodes; a first switching circuit configured to electrically couple or uncouple the first common wiring to or from the pixel signal wiring; and a second switching circuit configured to electrically couple or uncouple the first common wiring to or from the detection electrode wiring.

DETAILED DESCRIPTION

Figure 1:
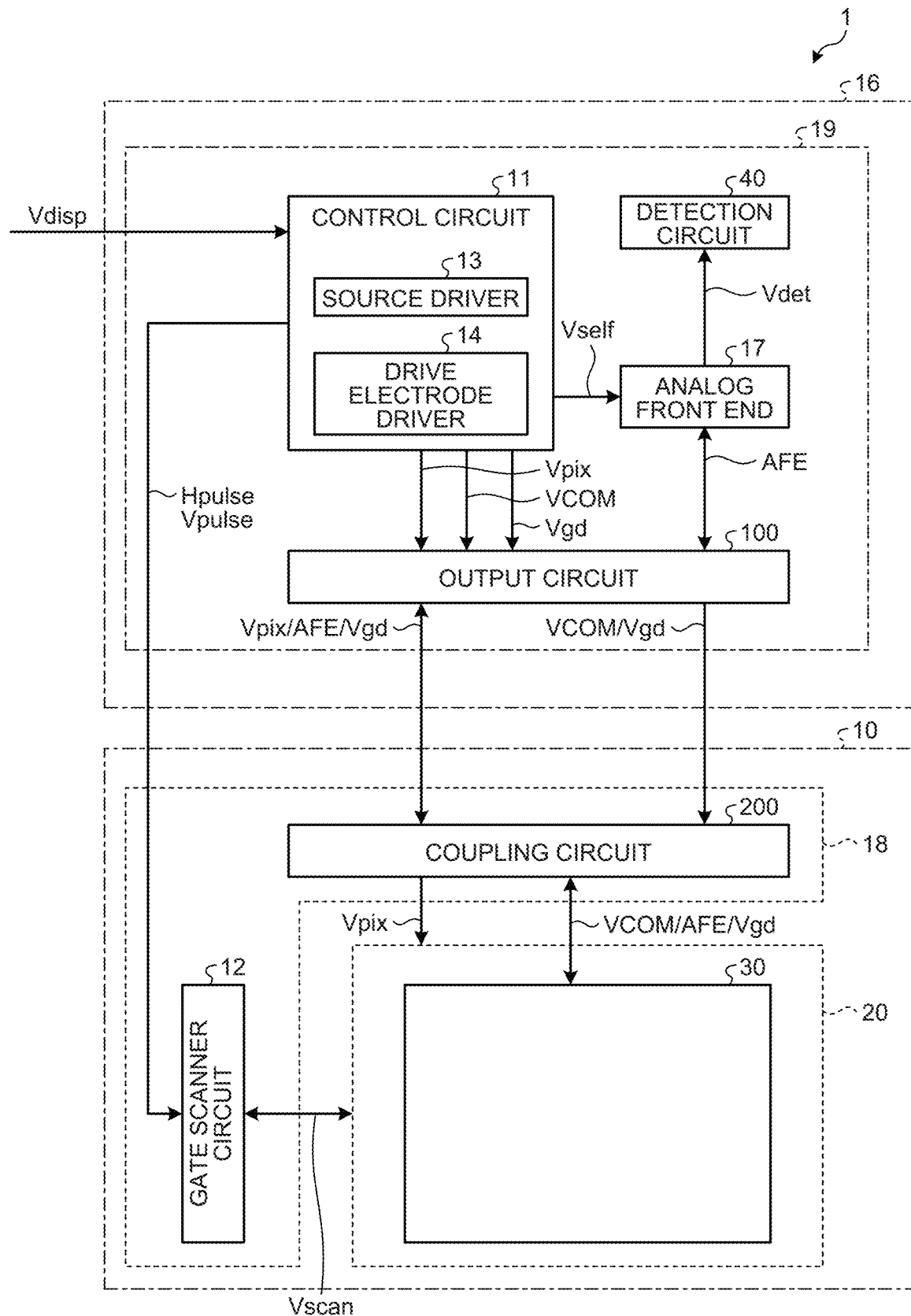
FIG. 1 is a block diagram illustrating a configuration example of a display device according to a first embodiment.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. Furthermore, the components described below can be combined as appropriate. The disclosure is merely an example, and the present disclosure naturally encompasses appropriate modifications easily conceivable by those skilled in the art while maintaining the gist of the disclosure. To further clarify the description, widths, thicknesses, shapes, and the like of various parts may be schematically illustrated in the drawings as compared with actual aspects thereof. However, they are merely examples, and the interpretation of the present disclosure is not limited thereto. The same component as that described with reference to an already mentioned drawing is denoted by the same reference numeral through the description and the drawings, and detailed description thereof may not be repeated where appropriate.

In this disclosure, when an element is described as being "on" another element, the element can be directly on the other element, or there can be one or more elements between the element and the other element.

First Embodiment

Figure 2:
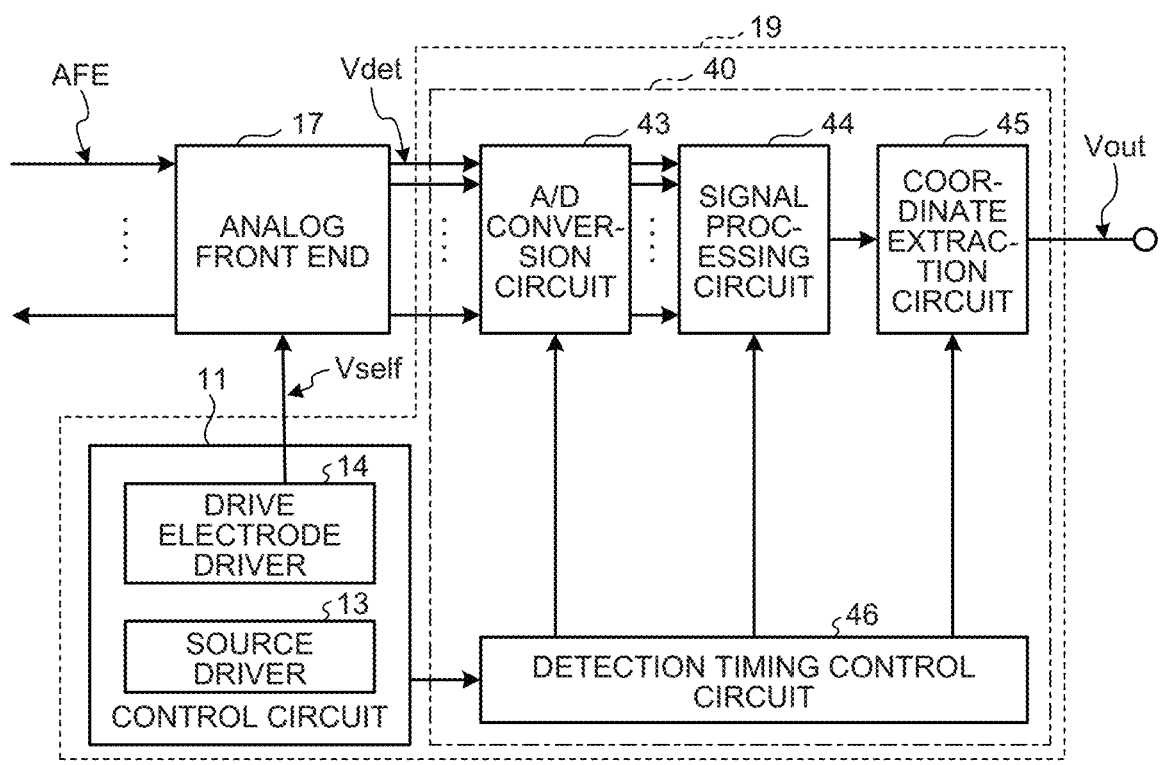
FIG. 2 is a block diagram illustrating a configuration example of a detection circuit.

FIG. 1 is a block diagram illustrating a configuration example of a display device according to a first embodiment. FIG. 2 is a block diagram illustrating a configuration example of a detection circuit. As illustrated in FIG. 1, a display device 1 includes a display panel 10, a control circuit 11, a detection circuit 40, an analog front end 17, and an output circuit 100. The control circuit 11, the detection circuit 40, the analog front end 17, and the output circuit 100 are included in a drive circuit 19. The drive circuit 19 is what is called a driver IC, and drives the display panel 10. The drive circuit 19 is the driver IC including, for example, an integrated circuit.

The display panel 10 includes a display region 20 for displaying an image and a sensing region 30 included in a detection device for detecting a touch input. The block diagrams illustrated in FIGS. 1 and 2 are diagrams for conceptually explaining the configurations, which may be other configurations.

The display panel 10 is a display device in which the display region 20 is integrated with the sensing region 30. Specifically, in the display panel 10, some of the members of the display region 20, including, for example, electrodes and substrates are also used as, for example, electrodes and substrates of the sensing region 30.

Liquid crystal display elements are used as display elements of the display region 20. The display region 20 includes a plurality of pixels having the display elements, and has a display surface facing the pixels. The display region 20 receives an input of a video signal Vdisp, and displays the image formed of pixels on the display surface. The display region 20 may be, for example, an organic electroluminescent (EL) display panel.

The display panel 10 further includes a coupling circuit 200. The coupling circuit 200 is provided in a peripheral region 18 outside the display region 20 of the display panel 10. The coupling circuit 200 is a circuit that switches between coupling and uncoupling the drive circuit 19 and the lines of wiring in the display region 20 based on, for example, a control signal supplied from the control circuit 11. The display panel 10 also includes a gate scanner circuit 12 to be described later.

The control circuit 11 includes a source driver 13 and a drive electrode driver 14. The control circuit 11 is a circuit that controls display operation and detection operation based on the externally supplied video signal Vdisp.

The control circuit 11 supplies a scan signal Vscan through the gate scanner circuit 12 to each horizontal line serving as a target of display driving of the display panel 10. This operation sequentially or simultaneously selects each horizontal line as the target of display driving.

Figure 7:
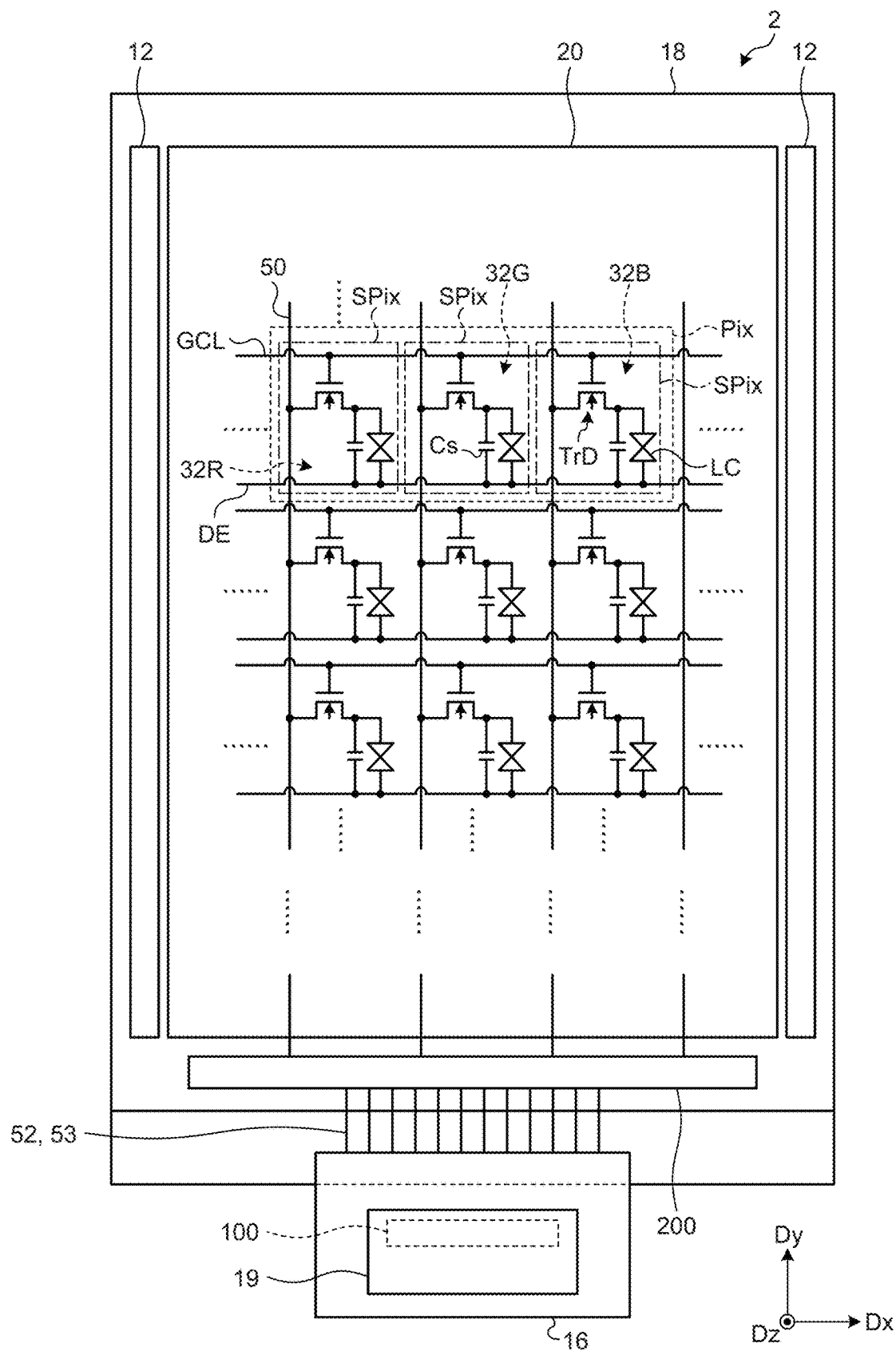
FIG. 7 is a circuit diagram illustrating a pixel array of a display region according to the first embodiment.

The source driver 13 is a circuit that generates a pixel signal Vpix to be supplied to each pixel Pix of the display region 20 (refer to FIG. 7). The polarity of the pixel signal Vpix may be inverted for each frame, for each horizontal period, or for each column of the video signal Vdisp.

Figure 5:
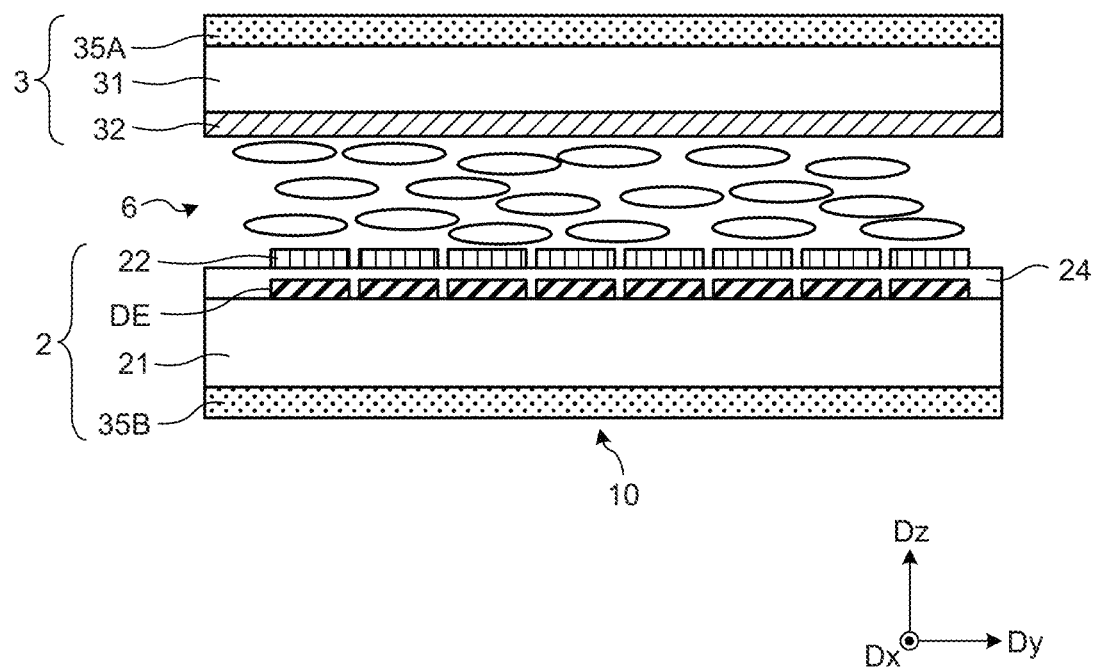
FIG. 5 is a sectional view illustrating a schematic sectional structure of the display device according to the first embodiment.
Figure 6:
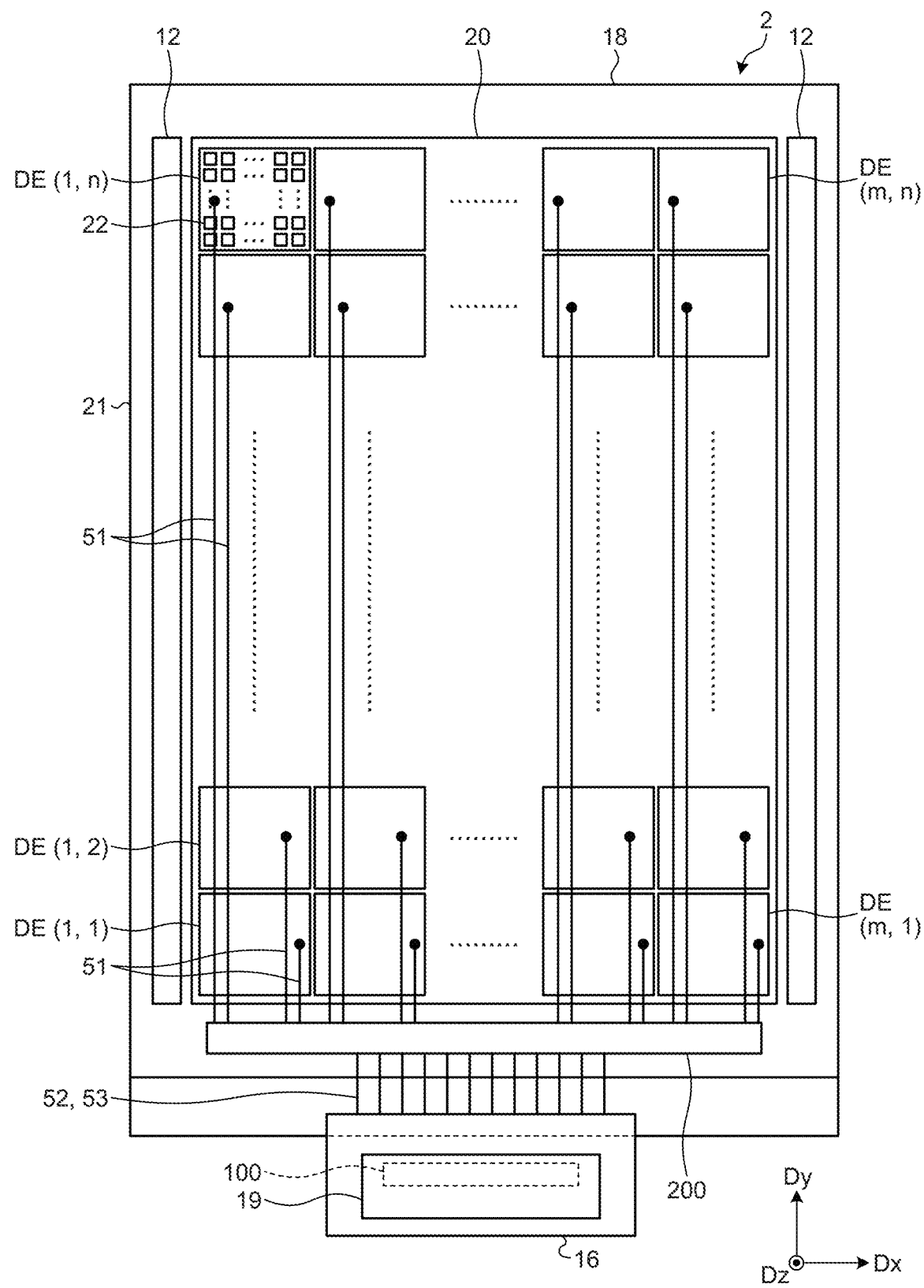
FIG. 6 is a plan view schematically illustrating an array substrate.

The drive electrode driver 14 is a circuit that generates a display drive signal VCOM to be supplied to a detection electrode DE of the display panel 10 (refer to FIGS. 5 and 6). The drive electrode driver 14 generates a detection drive signal Vself to be supplied to the detection electrode DE serving as a common electrode of the display panel 10. The drive electrode driver 14 has a function to generate a guard signal Vgd that has the same waveform as that of the detection drive signal Vself and is synchronized with the detection drive signal Vself.

In the present embodiment, the display device 1 has a display mode of performing the display using the display region 20 and a detection mode of detecting a detection target object (hereinafter, also called "touch detection") in the sensing region 30, as operation modes. The control circuit 11 performs the display mode operation and the detection mode operation in a time-division manner. In the present disclosure, the term "touch detection" refers to detecting a position of the detection target object in a state where the detection target object is in contact with a detection surface or the display surface, or in a state where the detection target object is proximate to the detection surface or the display surface enough to became equated with being in contact therewith. The control circuit 11 may have a hover detection mode as a detection mode in addition to the touch detection mode. In this case, the term "hover detection" refers to detecting the position and a movement of the detection target object in a state where the detection target object is not in contact with the detection surface or the display surface, or in a state where the detection target object is not proximate to the detection surface or the display surface enough to became equated with being in contact therewith.

A touch sensor of the sensing region 30 includes a function to detect the position of the detection target object in contact with or proximate to the detection surface or the display surface of the display panel 10 based on the basic principle of detection of the detection target object using a self-capacitance method to be described later.

The detection circuit 40 is a circuit that detects the detection target object in proximity to the display surface of the display panel 10 serving as the detection surface in the self-capacitive touch detection. If the detection surface is touched, the detection circuit 40 obtains, for example, coordinates where the touch input is made.

As illustrated in FIG. 2, the detection circuit 40 includes an analog-to-digital (A/D) conversion circuit 43, a signal processing circuit 44, a coordinate extraction circuit 45, and a detection timing control circuit 46. Based on a control signal supplied from the drive electrode driver 14, the detection timing control circuit 46 controls the A/D conversion circuit 43, the signal processing circuit 44, and the coordinate extraction circuit 45 so as to operate them in synchronization with one another.

The drive electrode driver 14 supplies the detection drive signal Vself through the analog front end 17 to the detection electrode DE to be described later. The detection circuit 40 receives a detection signal Vdet supplied from the detection electrode DE through the analog front end 17. The analog front end 17 performs signal regulation on the detection signal Vdet by, for example, reducing the noise thereof and amplifying the signal component thereof. A signal between the analog front end 17 and the detection electrode DE is hereinafter called a "detection input/output signal AFE".

The A/D conversion circuit 43 samples the analog signals output from the analog front end 17 and converts them into digital signals at times synchronized with the detection drive signal Vself.

The signal processing circuit 44 is a logic circuit that detects whether the display panel 10 is touched based on output signals of the A/D conversion circuit 43. The signal processing circuit 44 performs processing of extracting a signal of a difference in detection signal (absolute value |ΔV|) caused by a finger. The signal processing circuit 44 compares the absolute value |ΔV| with a predetermined threshold voltage, and, if the absolute value |ΔV| is below the threshold voltage, determines that the detection target object is in an absent state. If, instead, the absolute value |ΔV| is equal to or above the threshold voltage, the signal processing circuit 44 determines that the detection target object is in a present state. In this way, the detection circuit 40 can perform the touch detection.

The coordinate extraction circuit 45 is a logic circuit that obtains the coordinates of the detection target object when the detection target object is detected by the signal processing circuit 44. The coordinate extraction circuit 45 outputs the coordinates of the detection target object as an output signal Vout. The coordinate extraction circuit 45 may output the output signal Vout to the control circuit 11. The control circuit 11 can perform a predetermined display operation or detection operation based on the output signal Vout.

The A/D conversion circuit 43, the signal processing circuit 44, the coordinate extraction circuit 45, and the detection timing control circuit 46 of the detection circuit 40 are incorporated in the display device 1. The present disclosure is, however, not limited to this configuration. All or some of the functions of the detection circuit 40 may be incorporated in an external processor or the like. For example, the coordinate extraction circuit 45 may be incorporated in the external processor separate from the display device 1, and the detection circuit 40 may output the signal processed by the signal processing circuit 44 as the output signal Vout.

The pixel signal Vpix, the display drive signal VCOM, the guard signal Vgd, and the detection input/output signal AFE are switched in a time-division manner by the output circuit 100 and the coupling circuit 200, and are supplied to the display region 20 and the sensing region 30. Detailed configurations and operations of the output circuit 100 and the coupling circuit 200 will be described later.

Figure 3:
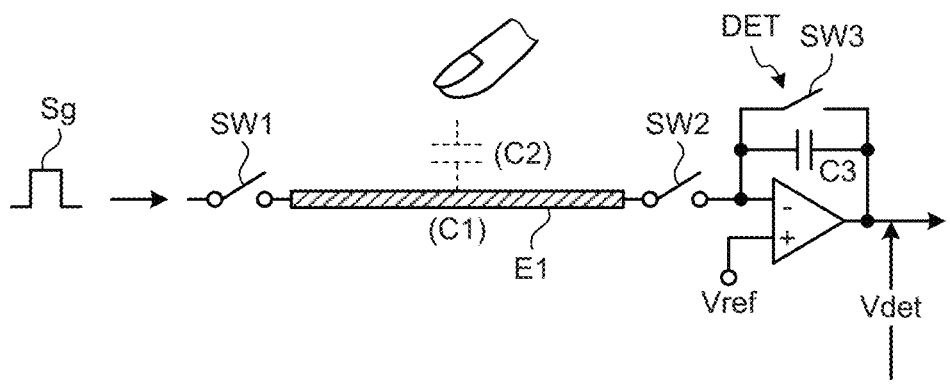
FIG. 3 is an explanatory diagram for explaining the basic principle of self-capacitive detection, which illustrates a state where a detection target object is present.
Figure 4:
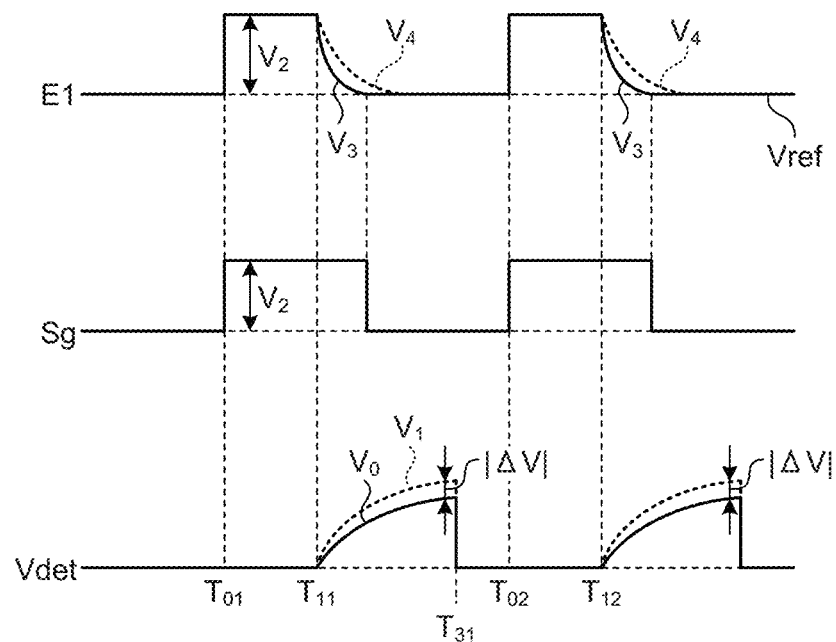
FIG. 4 is a diagram illustrating an example of waveforms of a drive signal and a detection signal of the self-capacitive detection.

The display panel 10 is subjected to touch control based on the basic principle of the capacitive touch detection. The following describes the basic principle of detection of the detection target object using the self-capacitance method performed on the display panel 10 of the present embodiment, with reference to FIGS. 3 and 4. FIG. 3 is an explanatory diagram for explaining the basic principle of the self-capacitive detection, illustrating the state where the detection target object is present. FIG. 4 is a diagram illustrating an example of waveforms of the drive signal and the detection signal of the self-capacitive detection. FIG. 3 illustrates also a detection circuit. Although the following describes the case where the detection target object is a finger, the detection target object is not limited to a finger, and may be an object including a conductor, such as a stylus pen.

When the detection target object is in the absent state, an alternating current (AC) rectangular wave Sg having a predetermined frequency (ranging, for example, roughly from several kilohertz to several hundred kilohertz) is applied to a detection electrode E1. The detection electrode E1 has electrostatic capacitance C1, and a current corresponding to the electrostatic capacitance C1 flows. A voltage detector DET converts a variation in the current corresponding to the AC rectangular wave Sg into a variation in voltage (waveform $V_0$ indicated by a solid line, refer to FIG. 4).

Then, as illustrated in FIG. 3, when the detection target object is in the present state, electrostatic capacitance C2 between the finger and the detection electrode E1 is added to the electrostatic capacitance C1 of the detection electrode E1. Consequently, a current corresponding to the electrostatic capacitance C1 and the electrostatic capacitance C2 flows when the AC rectangular wave Sg is applied to the detection electrode E1. As illustrated in FIG. 4, the voltage detector DET converts the variation in the current corresponding to the AC rectangular wave Sg into a variation in voltage (waveform $V_1$ indicated by a dotted line). The presence of the detection target object is detected based on the absolute value $|\Delta V|$ of the difference between the waveform $V_0$ and the waveform $V_1$.

Specifically, in FIG. 4, the AC rectangular wave Sg rises to a level corresponding to a voltage $V_2$ at time $T_{01}$. At this time, a switch SW1 is turned on and a switch SW2 is turned off, so that the potential of the detection electrode E1 also rises to the voltage $V_2$. Then, the switch SW1 is turned off before time $T_{11}$. At this time, the detection electrode E1 is brought into a floating state, but the potential of the detection electrode E1 is maintained at $V_2$ by the electrostatic capacitance C1 (or C1+C2, refer to FIG. 3) of the detection electrode E1. In addition, the voltage detector DET is reset before time $T_{11}$.

Subsequently, turning on the switch SW2 at time $T_{11}$ moves an electric charge stored in the electrostatic capacitance C1 (or C1+C2) of the detection electrode E1 to a capacitor C3 in the voltage detector DET. As a result, the output of the voltage detector DET increases (refer to the detection signal Vdet in FIG. 4). When the detection target object is in the absent state, the output (detection signal Vdet) of the voltage detector DET forms the waveform $V_0$ indicated by the solid line, and is given as Vdet=$C1 \times V_2/C3$. When the detection target object is in the present state, the output (detection signal Vdet) forms the waveform $V_1$ indicated by the dotted line, and is given as Vdet=$(C1+C2) \times V_2/C3$.

Then, at time $T_{31}$, the switch SW2 is turned off and the switch SW1 and a switch SW3 is turned on. As a result, the potential of the detection electrode E1 is set to a low level equal to the potential of the AC rectangular wave Sg, and the voltage detector DET is reset. The operation described above is repeated at the predetermined frequency (ranging, for example, roughly from several kilohertz to several hundred kilohertz). In this way, the detection circuit 40 can detect the present state of the detection target object based on the basic principle of detection of the detection target object using the self-capacitance method.

The following describes a configuration example of the display device 1 in detail. FIG. 5 is a sectional view illustrating a schematic sectional structure of the display device according to the first embodiment. As illustrated in FIG. 5, the display panel 10 includes an array substrate 2, a counter substrate 3, and a liquid crystal layer 6 as a display functional layer. The counter substrate 3 is disposed so as to face a surface of the array substrate 2 in a direction orthogonal thereto. The liquid crystal layer 6 is provided between the array substrate 2 and the counter substrate 3.

The array substrate 2 includes a first substrate 21, a pixel electrode 22, the detection electrode DE, an insulating layer 24, and a polarizing plate 35B. The first substrate 21 is provided with circuits including, for example, the gate scanner circuit 12, switching elements such as thin-film transistors (TFTs), and various types of wiring including gate lines GCL and signal lines SGL (not fully illustrated in FIG. 7).

The detection electrode DE is provided on an upper side of the first substrate 21. The pixel electrode 22 is provided on the upper side of the detection electrode DE with the insulating layer 24 interposed therebetween, and a plurality of the pixel electrodes 22 are arranged in a matrix having a row-column configuration in a plan view. The pixel electrode 22 is provided so as to correspond to a sub-pixel SPix included in each of the pixels Pix (refer to FIG. 7) of the display panel 10, and is supplied with the pixel signal Vpix for performing the display operation. The detection electrode DE is supplied with the display drive signal VCOM during the display operation, and serves as the common electrode for the pixel electrodes 22. The polarizing plate 35B is provided on a lower side of the first substrate 21.

In the present embodiment, for example, a light-transmitting conductive material such as indium tin oxide (ITO) is used for the pixel electrode 22 and the detection electrode DE.

In the present specification, the term "upper side" denotes a direction from the first substrate 21 toward a second substrate 31 in a direction orthogonal to the first substrate 21. The term "lower side" denotes a direction from the second substrate 31 toward the first substrate 21.

The arrangement of the pixel electrodes 22 can not only be the matrix arrangement in which the pixel electrodes 22 are arranged in a first direction Dx and a second direction Dy orthogonal to the first direction Dx, but also employ a configuration in which the pixel electrodes 22 facing each other are arranged so as to be displaced from each other in the first direction Dx or the second direction Dy. A configuration can also be employed in which, using a difference in size between the pixel electrodes 22 facing each other, two or three of the pixel electrodes 22 are arranged on one side of one of the pixel electrodes 22 included in a pixel array arranged in the first direction Dx.

The counter substrate 3 includes the second substrate 31, a color filter 32 formed on one surface of the second substrate 31, and a polarizing plate 35A provided on the other surface of the second substrate 31. The color filter 32 faces the liquid crystal layer 6 in the direction orthogonal to the first substrate 21. The color filter 32 may be disposed on the first substrate 21. In the present embodiment, the first substrate 21 and the second substrate 31 are, for example, glass substrates or resin substrates.

The first substrate 21 and the second substrate 31 are arranged so as to face each other with a predetermined gap provided therebetween. The liquid crystal layer 6 is provided between the first substrate 21 and the second substrate 31. In the liquid crystal layer 6, the orientation state of liquid crystal molecules changes corresponding to a state of an electric field generated between layers. As a result, transmitted light is modulated. For example, a horizontal electric field mode, such as an in-plane switching (IPS) mode including a fringe field switching (FFS) mode is employed as an electric field mode for such a modulation. Orientation films (not illustrated in FIG. 5) for setting an initial orientation state of the liquid crystal molecules are formed on the outermost surface of the array substrate 2 and the outermost surface of the counter substrate 3, the substrates 2 and 3 facing the liquid crystal layer 6 illustrated in FIG. 5.

An illumination unit (backlight), which is not illustrated, is provided on the lower side of the first substrate 21. The illumination unit includes a light source such as a light-emitting diode (LED), and emits light from the light source toward the first substrate 21. The light from the illumination unit passes through the array substrate 2, and is modulated according to the orientation state of the liquid crystal at a location of the light. Thus, the state of transmission of the light to the display surface varies with location. As a result, the image is displayed on the display surface.

FIG. 6 is a plan view schematically illustrating the array substrate. As illustrated in FIG. 6, in the display device 1, the peripheral region 18 is provided outside the display region 20. In the present disclosure, the display region 20 is a region for displaying the image, and is a region overlapping the pixels Pix (sub-pixels SPix). The peripheral region 18 refers to a region inside the outer circumference of the first substrate 21 and outside the display region 20. The peripheral region 18 may have a frame-like shape surrounding the display region 20. In that case, the peripheral region 18 can be called a frame region.

In the present embodiment, the first direction Dx is a direction along a short side of the display region 20. The second direction Dy is a direction orthogonal to the first direction Dx. The second direction Dy is not limited to this direction, and may intersect the first direction Dx at an angle other than 90 degrees. A plane defined by the first direction Dx and the second direction Dy is parallel to a surface of the first substrate 21. A third direction Dz intersecting the first direction Dx and the second direction Dy is a thickness direction of the first substrate 21.

As illustrated in FIG. 6, a plurality of the detection electrodes DE are arranged in the first direction Dx and the second direction Dy in a matrix having a row-column configuration in the display region 20. Each of the detection electrodes DE is rectangular or square in the plan view. The detection electrode DE is made of, for example, a light-transmitting conductive material such as indium tin oxide (ITO).

In the example illustrated in FIG. 6, for example, a plurality of detection electrodes DE(1,1), DE(1,2), . . . , DE(1,n) are arranged in the second direction Dy. A plurality of detection electrodes DE(1,1), . . . , DE(m,1) are arranged in the first direction Dx. In the same way, a plurality of detection electrodes DE(m,1), . . . , DE(m,n) are arranged in the second direction Dy. The detection electrodes DE(1,1), . . . , DE(m,n) are each simply referred to as "detection electrode DE" when they need not be mentioned in a distinguished manner. In the first embodiment, the example is illustrated in which m is 12 and n is 16. However, the values of m and n are not limited to those values. The value of m may be any value, and the value of n may also be any value.

A plurality of the pixel electrodes 22 are arranged in a matrix having a row-column configuration in a position corresponding to each of the detection electrodes DE. The pixel electrode 22 has an area smaller than that of the detection electrode DE. Although FIG. 6 illustrates some of the detection electrodes DE and the pixel electrodes 22, the detection electrodes DE and the pixel electrodes 22 are arranged over the entire area of the display region 20. In this way, the detection electrode DE are provided in the area overlapping the display region 20. In the present disclosure, the row direction is also called the first direction Dx, and the column direction is also called the second direction Dy.

The arrangement of the pixel electrodes 22 can not only be the matrix arrangement in which the pixel electrodes 22 are arranged in the first direction Dx and the second direction Dy intersecting the first direction Dx, but also employ a configuration in which the pixel electrodes 22 facing each other are arranged so as to be displaced from each other in the first direction Dx or the second direction Dy. A configuration can also be employed in which, using a difference in size between the pixel electrodes 22 facing each other, two or three of the pixel electrode 22 are arranged on one side of one of the pixel electrodes 22 included in a pixel array arranged in the first direction Dx.

The coupling circuit 200 is provided on a short side of the peripheral region 18. A circuit board 16 is coupled to the short side of the peripheral region 18. The circuit board 16 includes, for example, flexible printed circuits (FPC). The circuit board 16 is bonded to the first substrate 21, for example, with a film-on-glass (FOG) method using an anisotropic conductive film (ACF) (hereinafter, called "FOG mounted"). This configuration electrically couples lines of wiring of the first substrate 21 to the lines of wiring of the circuit board 16 corresponding to the lines of wiring of the first substrate 21.

The drive circuit 19 is provided on the circuit board 16. As illustrated in FIG. 1, the drive circuit 19 includes the control circuit 11, the detection circuit 40, the analog front end 17, and the output circuit 100. The drive circuit 19 is mounted on the circuit board 16, for example, with a chip-on-film (COF) method using an ACF (hereinafter, called "COF mounted"). The drive circuit 19 is not limited to this example, and may be chip-on-glass (COG) mounted on the first substrate 21. If the drive circuit 19 is COG mounted, the drive circuit 19 is provided between the coupling circuit 200 and an FOG terminal to which the circuit board 16 is coupled. Some of the functions of the detection circuit 40 may be included in another integrated circuit for detection, or included as functions of an external microprocessing unit (MPU). The drive circuit 19 is not limited to the above mounting forms, and may be provided, for example, on a control board outside the module.

The detection electrodes DE are electrically coupled to the drive circuit 19 through detection electrode wiring 51, the coupling circuit 200, first common wiring 52, and second common wiring 53. A plurality of lines of the detection electrode wiring 51 are electrically coupled to the respective detection electrodes DE arranged in the display region 20, and are lead out to the peripheral region 18. Each of the lines of the detection electrode wiring 51 extends along the second direction Dy, and the lines of the detection electrode wiring 51 are arranged in the first direction Dx.

The following describes a pixel array of the display panel 10. FIG. 7 is a circuit diagram illustrating the pixel array of the display region according to the first embodiment.

The display region 20 illustrated in FIG. 7 include the sub-pixels SPix arranged in a matrix having a row-column configuration. Each of the sub-pixels SPix includes a switching element TrD and a liquid crystal LC. The switching element TrD is made of a thin film transistor, and in the example, is made of an n-channel metal-oxide-semiconductor (MOS) TFT. The insulating layer 24 is provided between the pixel electrode 22 and the detection electrode DE, and these components provide a storage capacitor Cs illustrated in FIG. 7.

The switching elements TrD of the respective sub-pixels SPix, pixel signal wiring 50, and the gate lines GCL illustrated in FIG. 7 are formed on the first substrate 21 (refer to FIG. 5). The pixel signal wiring 50 is wiring for supplying the pixel signal Vpix to each of the pixel electrodes 22. The gate lines GCL are wiring for supplying the drive signals to drive the respective switching elements TrD. The pixel signal wiring 50 and the gate lines GCL extend in a plane parallel to the surface of the first substrate 21.

In the color filter 32 illustrated in FIG. 5, for example, color regions colored in three colors of red (R), green (G), and blue (B) may be periodically arranged. Color regions 32R, 32G, and 32B for the three colors of R, G, and B are associated, as one set, with each set of the sub-pixels SPix illustrated in FIG. 7 described above. The sub-pixels SPix corresponding to the color regions 32R, 32G, and 32B for the three colors constitute, as one set, the pixel Pix. The color filter 32 may include color regions for four or more colors.

The switching element TrD of each of the sub-pixels SPix is electrically coupled to the drive circuit 19 through the pixel signal wiring 50, the coupling circuit 200, the first common wiring 52, and the second common wiring 53. A plurality of lines of the pixel signal wiring 50 are lead out to the peripheral region 18. Each of the lines of the pixel signal wiring 50 extends along the second direction Dy, and the lines of the pixel signal wiring 50 are arranged in the first direction Dx.

In the present embodiment, the pixel signal wiring 50 and the detection electrode wiring 51 are provided in different layers of the array substrate 2. A layer provided with the pixel signal wiring 50 and a layer provided with the detection electrode wiring 51 are arranged in the third direction Dz so as to overlap each other. The detection electrode wiring 51 and the pixel signal wiring 50 are not limited to this example, and may be formed in the same layer.

The gate scanner circuit 12 illustrated in FIG. 1 sequentially selects each of the gate lines GCL. The gate scanner circuit 12 applies the scan signal Vscan through the selected gate line GCL to the gate of the switching element TrD of the sub-pixel SPix. This operation sequentially selects each row (each horizontal line) of the sub-pixels SPix as the target of display driving. The source driver 13 supplies the pixel signal Vpix corresponding to each of the pixels Pix included in the selected horizontal line. The pixel signal Vpix is subjected to time-division processing on an individual sub-pixel SPix basis, the individual sub-pixel being included in the pixels Pix; and the time-divided signal is supplied through the pixel signal wiring 50. With the sub-pixels SPix described above, the display is performed horizontal line by horizontal line in response to the supplied pixel signal Vpix.

When the display operation is performed, the drive electrode driver 14 applies the display drive signal VCOM to all the detection electrodes DE. The display drive signal VCOM is a voltage signal that serves as a common potential for the sub-pixels SPix. As a result, the detection electrodes DE serve as the common electrode for the pixel electrodes 22 during the display operation. During the display, the drive electrode driver 14 applies the display drive signal VCOM to all the detection electrodes DE in the display region 20.

Figure 8:
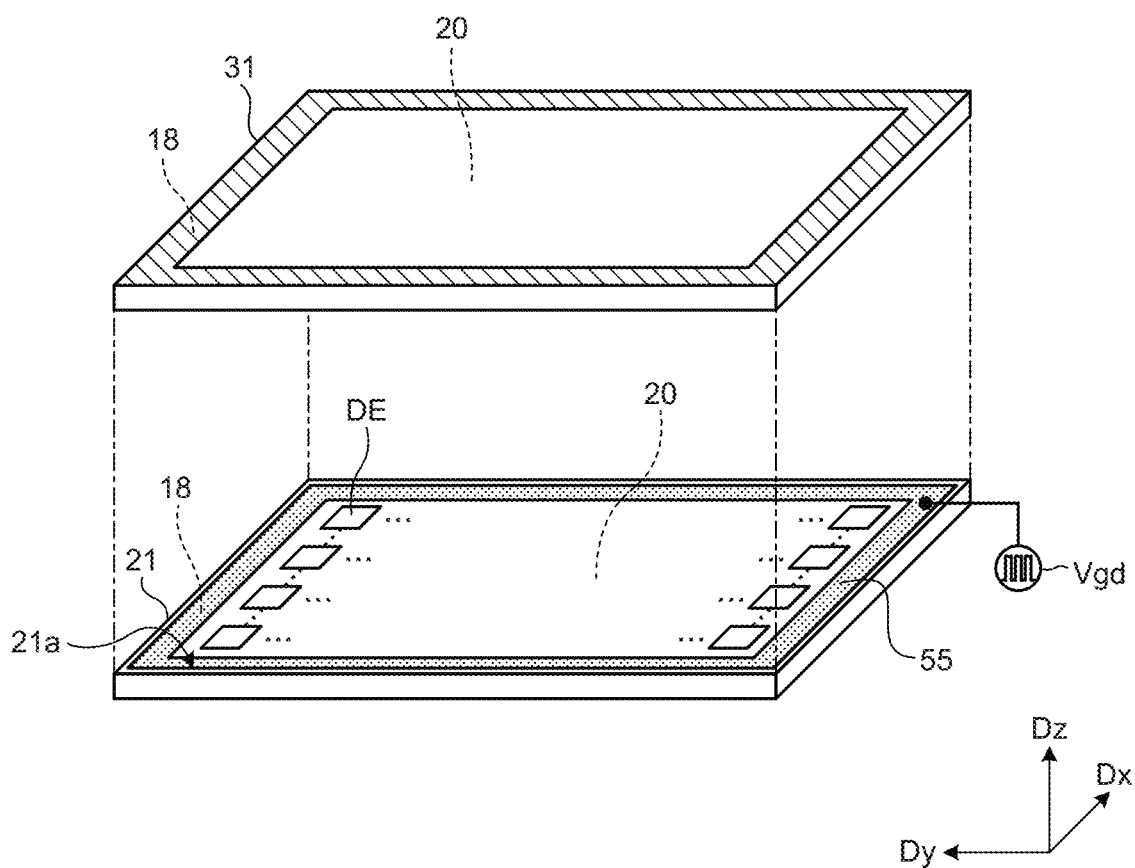
FIG. 8 is a perspective view illustrating an arrangement example of detection electrodes.

FIG. 8 is a perspective view illustrating an arrangement example of the detection electrodes. As illustrated in FIG. 8, outer frame wiring 55 is provided in the peripheral region 18 on one surface 21a side of the first substrate 21. For example, the outer frame wiring 55 is continuously provided along long sides and short sides of the display region 20, and surrounds the display region 20. The outer frame wiring 55 may be supplied with the guard signal Vgd when the display device 1 detects whether the detection target object is in the present state.

Figure 9:
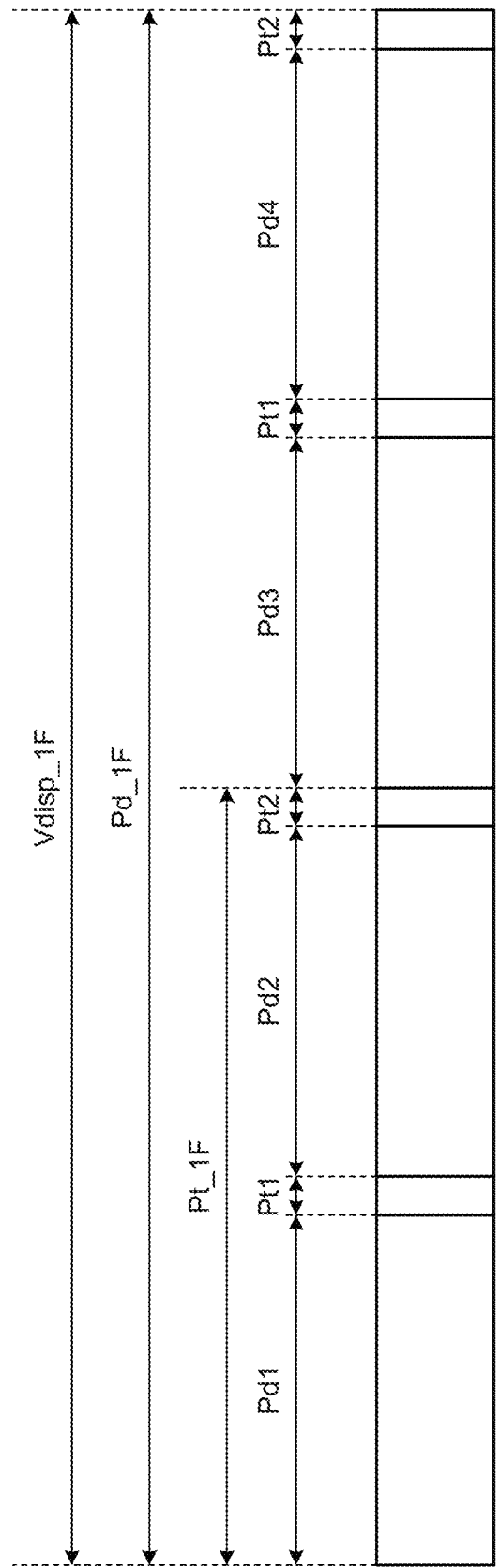
FIG. 9 is a diagram illustrating a time division example between a display mode and a detection mode in the display device according to the first embodiment.

FIG. 9 is a diagram illustrating a time division example between the display mode and the detection mode in the display device according to the first embodiment.

In the present embodiment, an operation in the display mode during a display period Pd and an operation in the detection mode during a detection period Pt are alternately performed in a time-division manner. In the example illustrated in FIG. 9, in a one-frame period of the video signal Vdisp, a one-frame period in the display mode is divided into four display periods Pd1, Pd2, Pd3, and Pd4. In the example illustrated in FIG. 9, in the one-frame period of the video signal Vdisp, a one-frame period in the detection mode is half the one-frame period of the video signal Vdisp.

In the example illustrated in FIG. 9, an example is illustrated in which a detection period Pt1 is provided between the display period Pd1 and the display period Pd2, and a detection period Pt2 is provided between the display period Pd2 and the display period Pd3.

Hereinafter, the display periods Pd1, Pd2, Pd3, and Pd4 are each simply called "display period Pd" when they need not be distinguished from one another.

FIGS. 10A to 10D are explanatory diagrams for explaining states where the detection electrodes supplied with the detection input/output signals are sequentially selected and switched. FIG. 11 is a diagram illustrating an example of the detection periods during which the detection input/output signals are supplied to the respective detection electrodes.

In the present embodiment, as illustrated in FIGS. 10A to 10D, four of the detection electrodes DE arranged adjacent to one another in the first direction Dx are treated as one unit, and each of the detection electrodes DE(1,4), DE(1,3), DE(1,2), and DE(1,1) is sequentially selected and supplied with the detection input/output signal AFE in a time-division manner.

Figure 10A:
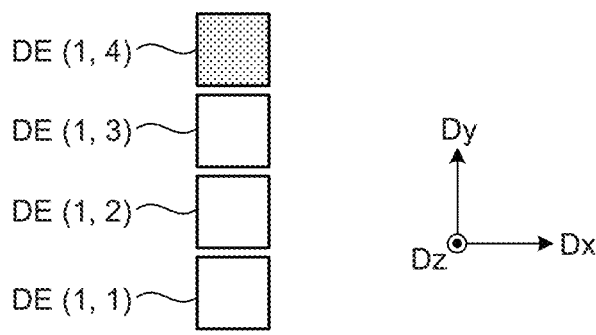
FIG. 10A is an explanatory diagram for explaining a state where the detection electrodes supplied with detection input/output signals are sequentially selected and switched.
Figure 11:
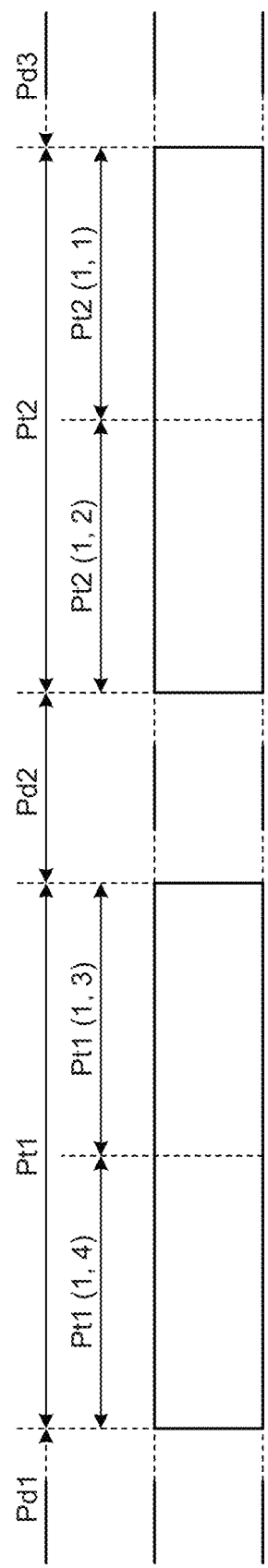
FIG. 11 is a diagram illustrating an example of detection periods during which the detection input/output signals are supplied to the respective detection electrodes.

In a detection period Pt1(1,4) illustrated in FIG. 11, the detection electrode DE(1,4) is selected (refer to FIG. 10A). In the detection period Pt1(1,4), the detection input/output signal AFE is supplied to the detection electrode DE(1,4), and the guard signal Vgd is supplied to the detection electrodes DE(1,3), DE(1,1), and DE(1,2).

Figure 10B:
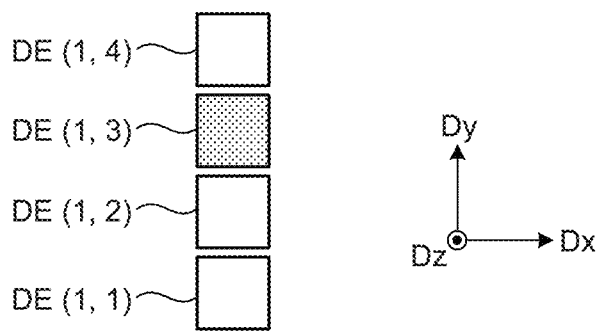
FIG. 10B is an explanatory diagram for explaining another state where the detection electrodes supplied with the detection input/output signals are sequentially selected and switched.

In a detection period Pt1(1,3) illustrated in FIG. 11, the detection electrode DE(1,3) is selected (refer to FIG. 10B). In the detection period Pt1(1,3), the detection input/output signal AFE is supplied to the detection electrode DE(1,3), and the guard signal Vgd is supplied to the detection electrodes DE(1,4), DE(1,1), and DE(1,2).

Figure 10C:
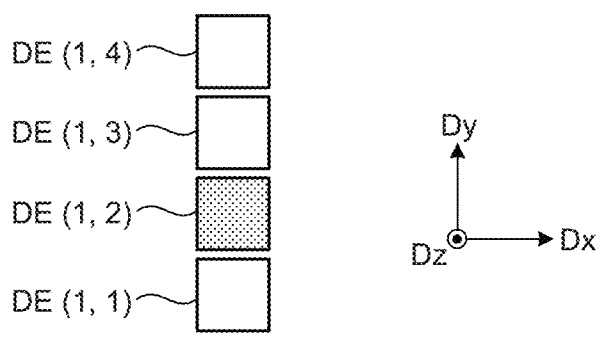
FIG. 10C is an explanatory diagram for explaining still another state where the detection electrodes supplied with the detection input/output signals are sequentially selected and switched.

In a detection period Pt2(1,2) illustrated in FIG. 11, the detection electrode DE(1,2) is selected (refer to FIG. 10C). In the detection period Pt2(1,2), the detection input/output signal AFE is supplied to the detection electrode DE(1,2), and the guard signal Vgd is supplied to the detection electrodes DE(1,3), DE(1,4), and DE(1,1).

Figure 10D:
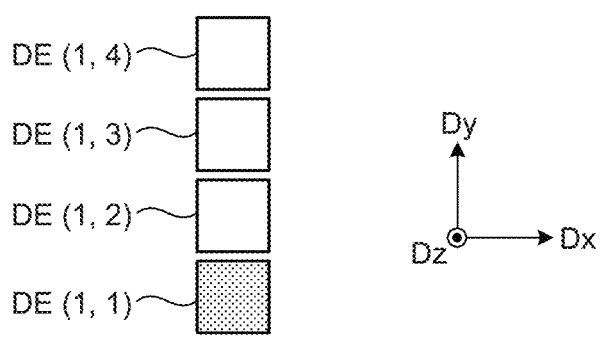
FIG. 10D is an explanatory diagram for explaining still another state where the detection electrodes supplied with the detection input/output signals are sequentially selected and switched.

In a detection period Pt2(1,1) illustrated in FIG. 11, the detection electrode DE(1,1) is selected (refer to FIG. 10D). In the detection period Pt2(1,1), the detection input/output signal AFE is supplied to the detection electrode DE(1,1), and the guard signal Vgd is supplied to the detection electrodes DE(1,3), DE(1,4), and DE(1,2).

Hereinafter, the detection periods Pt1, Pt2, Pt1(1,4), Pt1(1,3), Pt2(1,2), and Pt2(1,1) are each simply called "detection period Pt" when they need not be distinguished from one another.

In the present disclosure, for example, the display periods, the detection periods, and the number and switching order of the detection electrodes supplied with the detection input/output signal AFE hereinafter have the aspects illustrated in FIGS. 9 to 11. The aspects of, for example, the display periods, the detection periods, and the number and switching order of the detection electrodes supplied with the detection input/output signal AFE illustrated in FIGS. 9 to 11 are mere examples, and are not limited to the above-described aspects.

The following describes differences between the display device according to the first embodiment and comparative examples. The following description exemplifies the number of the lines of the pixel signal wiring 50 as 1080, and the number of the lines of the detection electrode wiring 51 as 648. The internal configurations and the operations of the output circuit 100 and the coupling circuit 200 of the display device 1 according to the first embodiment will be described later.

Figure 12:
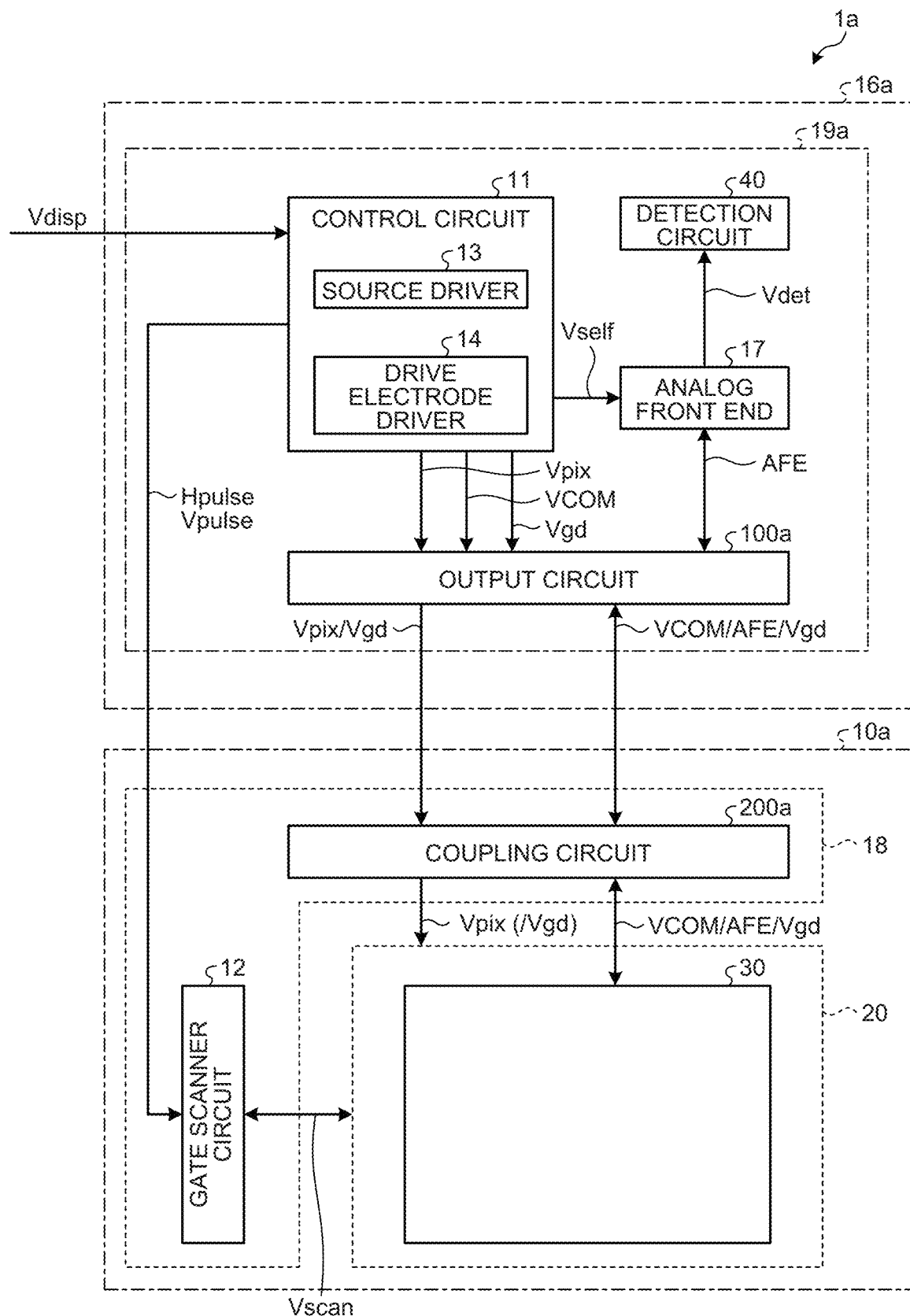
FIG. 12 is a block diagram illustrating a configuration example of a display device according to a first comparative example with respect to the first embodiment.
Figure 13:
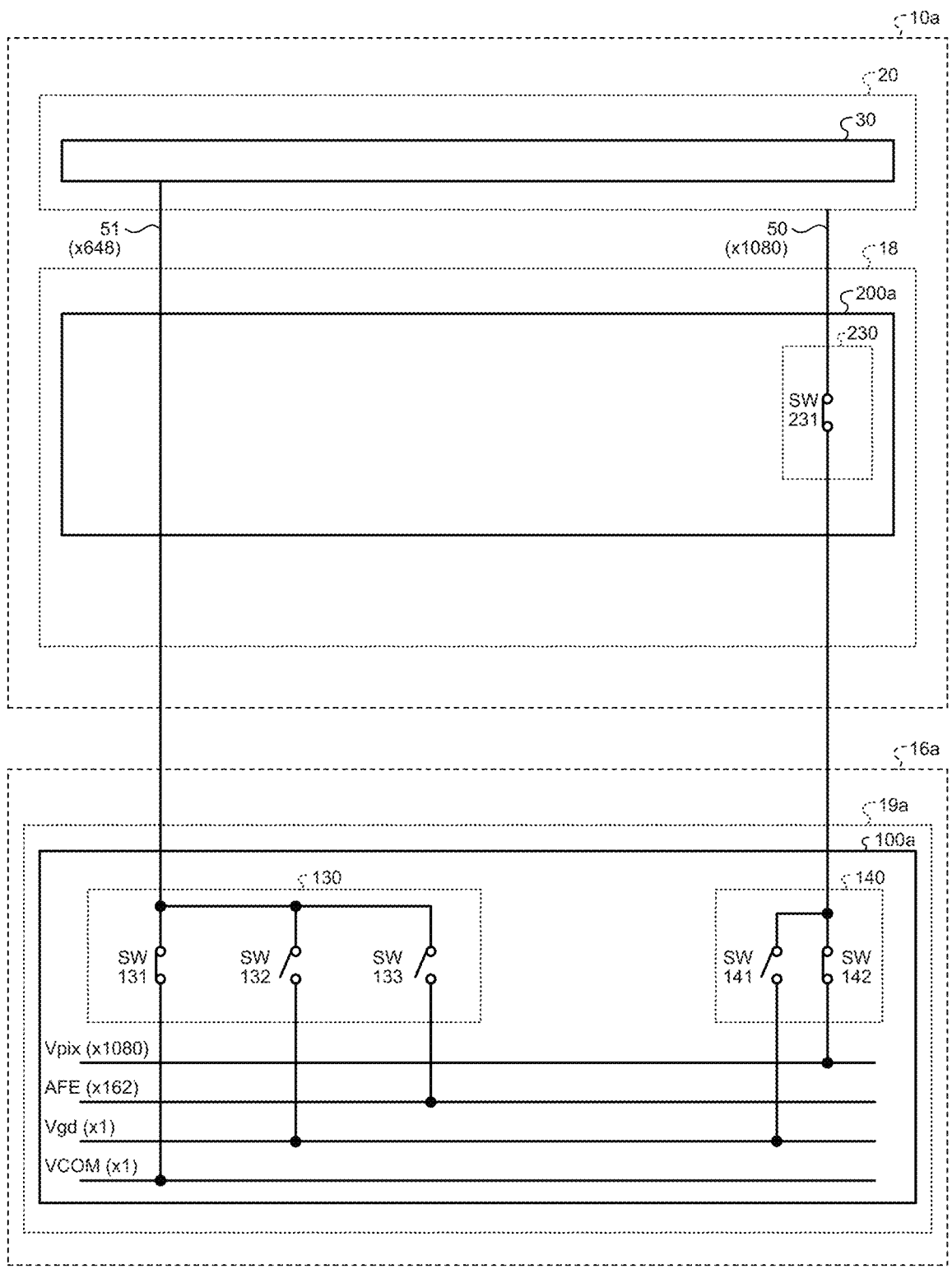
FIG. 13 is a diagram illustrating a configuration of an output circuit and a coupling circuit of the display device according to the first comparative example with respect to the first embodiment.
Figure 14:
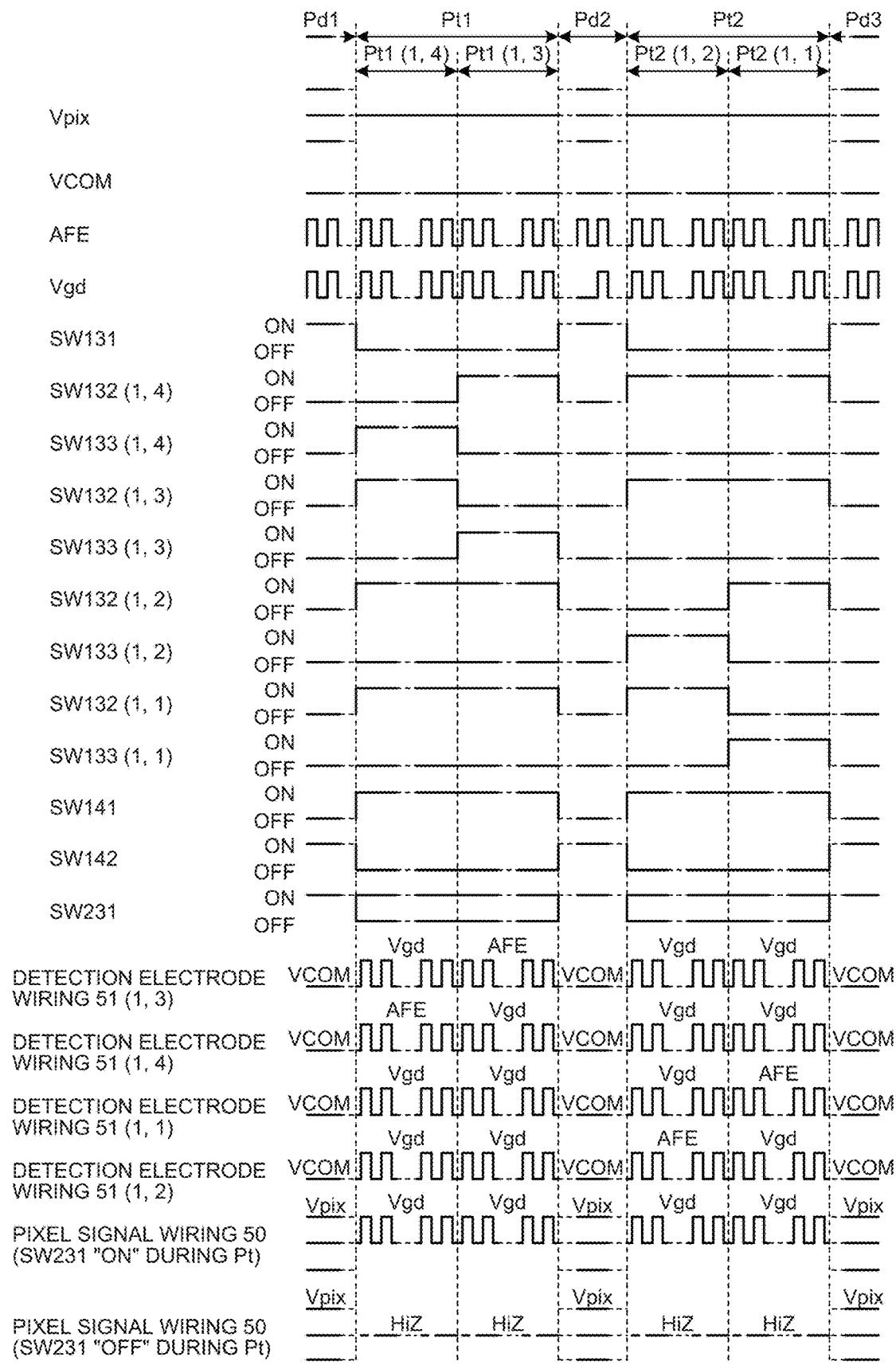
FIG. 14 is a diagram illustrating a timing control example of the display device according to the first comparative example with respect to the first embodiment.

FIG. 12 is a block diagram illustrating a configuration example of a display device according to a first comparative example with respect to the first embodiment. FIG. 13 is a diagram illustrating a configuration of an output circuit and a coupling circuit of the display device according to the first comparative example with respect to the first embodiment. FIG. 14 is a diagram illustrating a timing control example of the display device according to the first comparative example with respect to the first embodiment.

A display device 1a according to the first comparative example with respect to the first embodiment illustrated in FIG. 12 differs, in internal configurations and operations of an output circuit 100a and a coupling circuit 200a, from the display device 1 according to the first embodiment illustrated in FIG. 1.

In the first comparative example with respect to the first embodiment illustrated in FIG. 13, the output circuit 100a includes a switching circuit 130 and a switching circuit 140. The output circuit 100a includes, for example, a multiplexer.

The switching circuit 130 switches between the display drive signal VCOM, the detection input/output signal AFE, and the guard signal Vgd. The switching circuit 130 includes a switch SW131, a switch SW132, and a switch SW133.

The switching circuit 140 switches between the pixel signal Vpix and the guard signal Vgd. The switching circuit 140 includes a switch SW141 and a switch SW142.

In the first comparative example with respect to the first embodiment illustrated in FIG. 13, the coupling circuit 200a includes a switching circuit 230. The coupling circuit 200a includes, for example, a multiplexer.

The switching circuit 230 outputs the pixel signal Vpix in a time-division manner to the respective sub-pixels SPix constituting each of the pixels Pix. Herein, for ease of explanation, one switch SW231 is illustrated.

The following describes control states of the respective switches in the display period Pd of the display device 1a according to the first comparative example with respect to the first embodiment.

As illustrated in FIG. 14, in the display period Pd, each of the switches SW142, SW131, and SW231 is controlled to be on, and each of the switches SW132, SW133, and SW141 is controlled to be off. As a result, the pixel signal Vpix is applied to the pixel signal wiring 50, and the display drive signal VCOM is applied to the detection electrode wiring 51.

The following describes the control states of the respective switches in the detection period Pt of the display device 1a according to the first comparative example with respect to the first embodiment.

As illustrated in FIG. 14, in the detection period Pt, the switches SW141 and SW231, the switches SW132 corresponding to the non-selected detection electrodes DE, and the switch SW133 corresponding to the selected detection electrode DE are each controlled to be on. In the detection period Pt, the switch SW142, the switch SW132 corresponding to the selected detection electrode DE, and the switches SW133 corresponding to the non-selected detection electrodes DE are each controlled to be off. As a result, the guard signal Vgd is applied to the pixel signal wiring 50. The detection input/output signal AFE is applied to a line of the detection electrode wiring 51 corresponding to the selected detection electrode DE, and the guard signal Vgd is applied to lines of the detection electrode wiring 51 corresponding to the non-selected detection electrodes DE.

Specifically, in the detection period Pt1(1,4), the switches SW141 and SW231, the switches SW132(1,3), SW132(1,1), and SW132(1,2) corresponding to the non-selected detection electrodes DE(1,3), DE(1,1), and DE(1,2), and the switch SW133(1,4) corresponding to the selected detection electrode DE(1,4) are each controlled to be on. In the detection period Pt1(1,4), the switch SW142, the switch SW132(1,4) corresponding to the selected detection electrode DE(1,4), and the switches SW133(1,3), SW133(1,1), and SW133(1,2) corresponding to the non-selected detection electrodes DE(1,3), DE(1,1), and DE(1,2) are each controlled to be off.

In the detection period Pt1(1,3), the switches SW141 and SW231, the switches SW132(1,4), SW132(1,1), and SW132 (1,2) corresponding to the non-selected detection electrodes DE(1,4), DE(1,1), and DE(1,2), and the switch SW133(1,3) corresponding to the selected detection electrode DE(1,3) are each controlled to be on. In the detection period Pt1(1,3), the switch SW142, the switch SW132(1,3) corresponding to the selected detection electrode DE(1,3), and the switches SW133(1,4), SW133(1,1), and SW133(1,2) corresponding to the non-selected detection electrodes DE(1,4), DE(1,1), and DE(1,2) are each controlled to be off.

In the detection period Pt2(1,2), the switches SW141 and SW231, the switches SW132(1,3), SW132(1,4), and SW132 (1,1) corresponding to the non-selected detection electrodes DE(1,3), DE(1,4), and DE(1,1), and the switch SW133(1,2) corresponding to the selected detection electrode DE(1,2) are each controlled to be on. In the detection period Pt2(1,2), the switch SW142, the switch SW132(1,2) corresponding to the selected detection electrode DE(1,2), and the switches SW133(1,3), SW133(1,4), and SW133(1,1) corresponding to the non-selected detection electrodes DE(1,3), DE(1,4), and DE(1,1) are each controlled to be off.

In the detection period Pt2(1,1), the switches SW141 and SW231, the switches SW132(1,3), SW132(1,4), and SW132 (1,2) corresponding to the non-selected detection electrodes DE(1,3), DE(1,4), and DE(1,2), and the switch SW133(1,1) corresponding to the selected detection electrode DE(1,1) are each controlled to be on. In the detection period Pt2(1,1), the switch SW142, the switch SW132(1,1) corresponding to the selected detection electrode DE(1,1), and the switches SW133(1,3), SW133(1,4), and SW133(1,2) corresponding to the non-selected detection electrodes DE(1,3), DE(1,4), and DE(1,2) are each controlled to be off.

Figure 15:
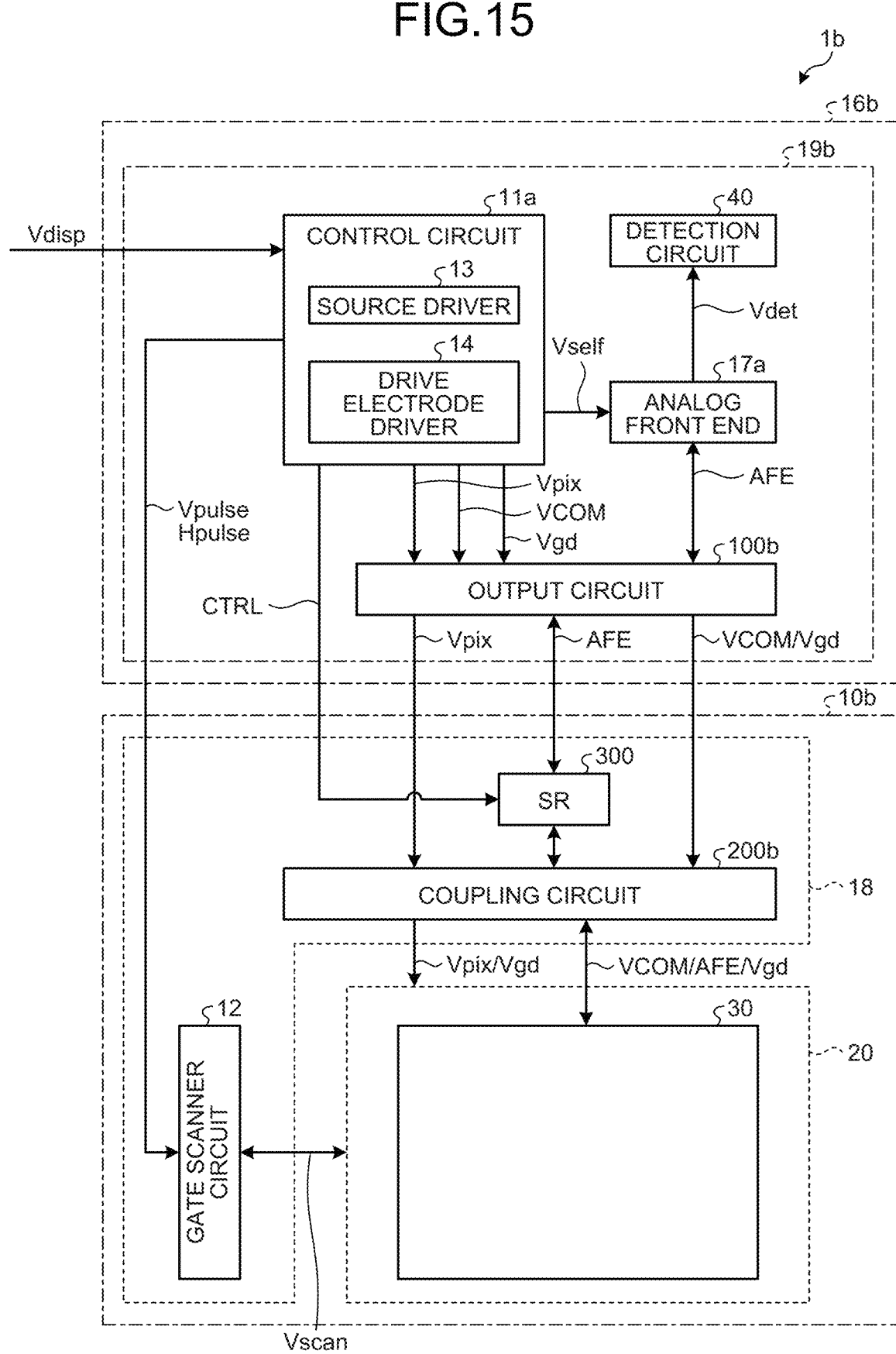
FIG. 15 is a block diagram illustrating a configuration example of a display device according to a second comparative example with respect to the first embodiment.
Figure 16:
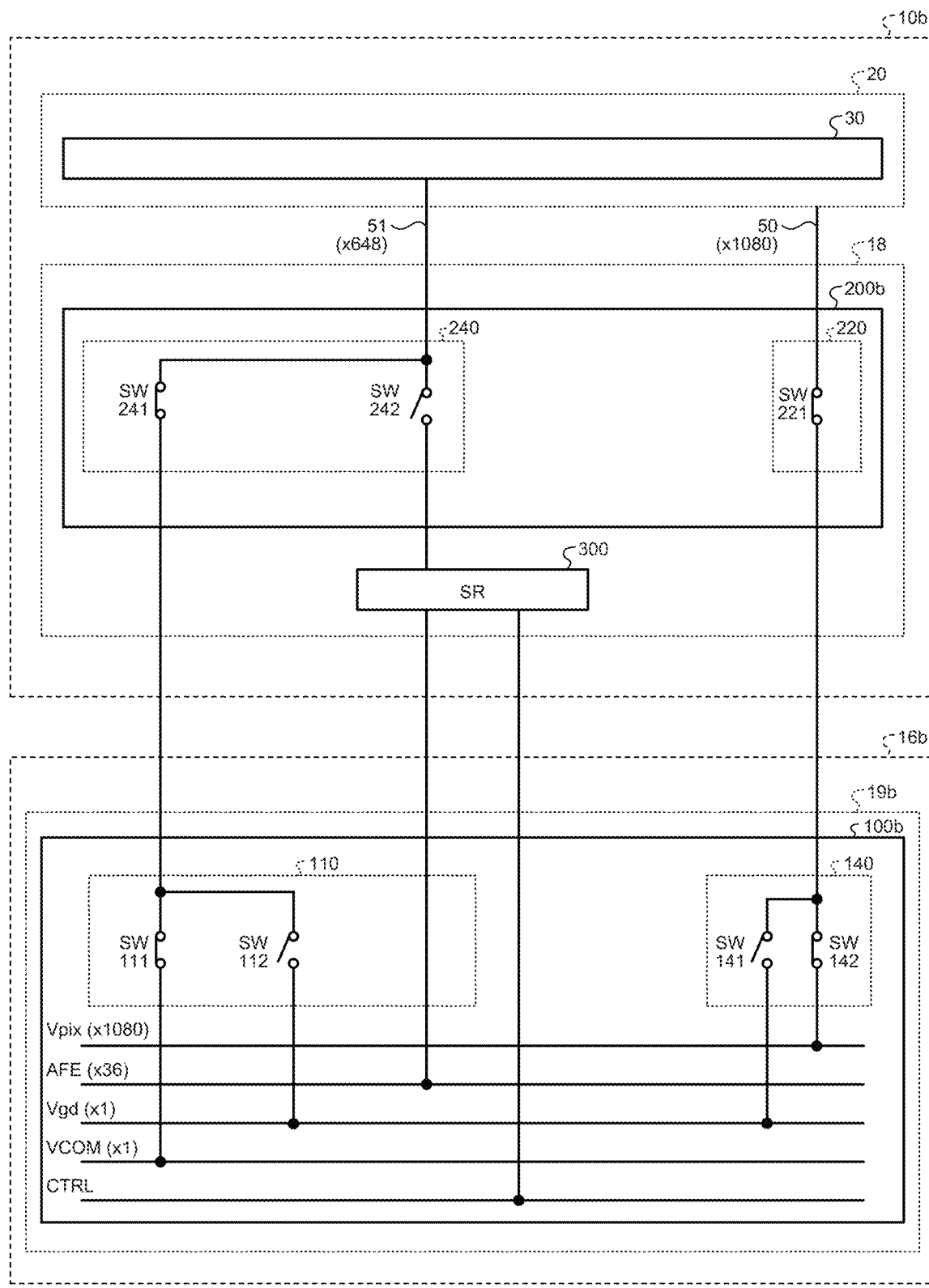
FIG. 16 is a diagram illustrating a configuration of an output circuit and a coupling circuit of the display device according to the second comparative example with respect to the first embodiment.
Figure 17:
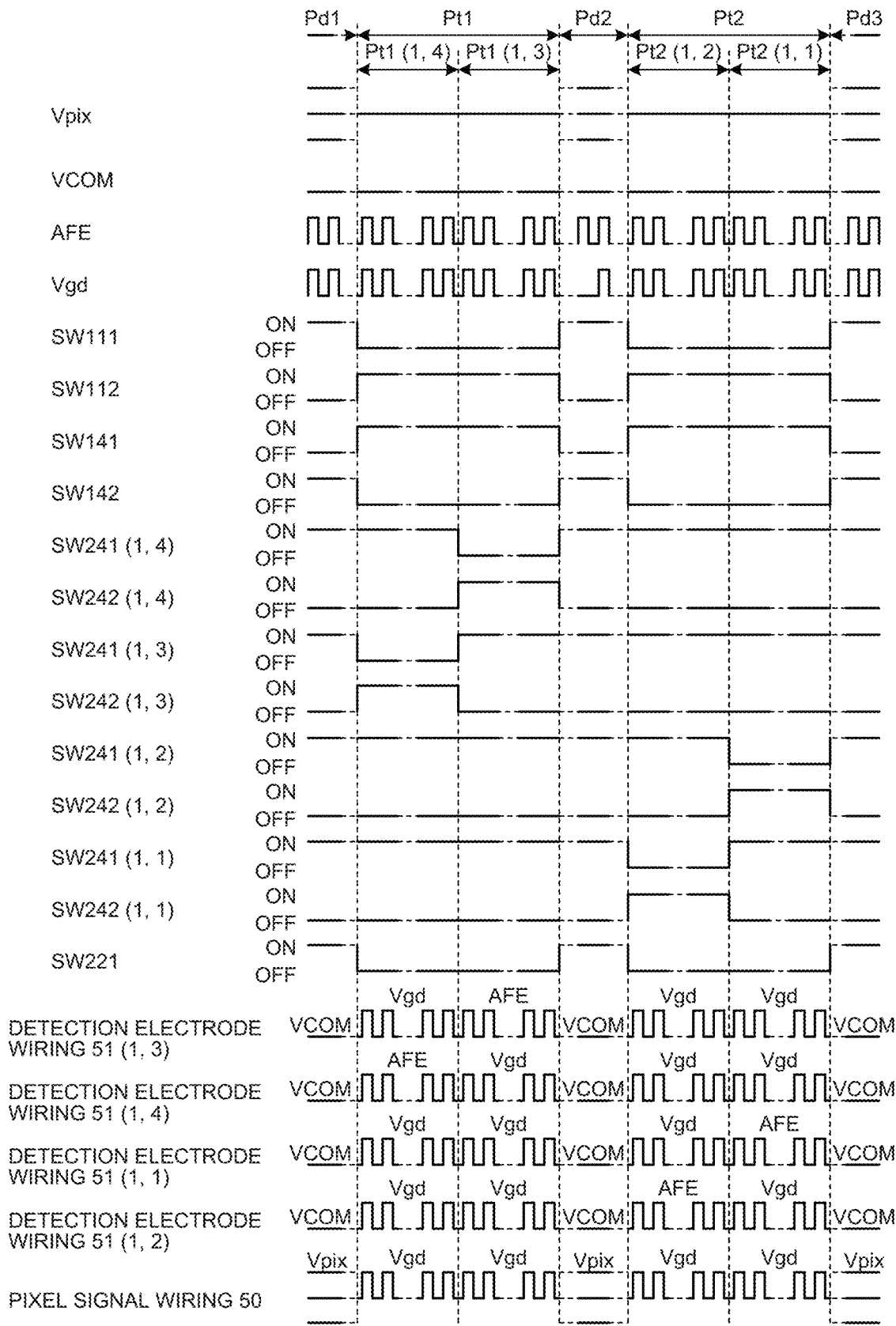
FIG. 17 is a diagram illustrating a timing control example of the display device according to the second comparative example with respect to the first embodiment.

FIG. 15 is a block diagram illustrating a configuration example of a display device according to a second comparative example with respect to the first embodiment. FIG. 16 is a diagram illustrating a configuration of an output circuit and a coupling circuit of the display device according to the second comparative example with respect to the first embodiment. FIG. 17 is a diagram illustrating a timing control example of the display device according to the second comparative example with respect to the first embodiment.

A display device 1b according to the second comparative example with respect to the first embodiment illustrated in FIG. 15 differs from the display device 1 according to the first embodiment illustrated in FIG. 1 in internal configurations and operations of an output circuit 100b and a coupling circuit 200b. In the second comparative example with respect to the first embodiment, an analog front end 17a outputs the detection input/output signals AFE of 36 systems obtained by dividing the 648 lines of the detection electrode wiring 51 by 18. The detection input/output signals AFE of the 36 systems are temporally divided by a shift register (SR) 300, and supplied to the coupling circuit 200b.

In the second comparative example with respect to the first embodiment illustrated in FIG. 16, the output circuit 100b includes a switching circuit 110 and the switching circuit 140. The output circuit 100b includes, for example, a multiplexer.

The switching circuit 110 switches between the display drive signal VCOM and the guard signal Vgd. The switching circuit 110 includes a switch SW111 and a switch SW112.

In the second comparative example with respect to the first embodiment illustrated in FIG. 16, the coupling circuit 200b includes a switching circuit 220 and a switching circuit 240. The coupling circuit 200b includes, for example, a multiplexer.

The switching circuit 220 outputs the pixel signal Vpix in a time-division manner to the respective sub-pixels SPix constituting each of the pixels Pix. Herein, for ease of explanation, one switch SW221 is illustrated.

The switching circuit 240 switches between the display drive signal VCOM or the guard signal Vgd selected by the switching circuit 110 and the detection input/output signal AFE. The switching circuit 240 includes a switch SW241 and a switch SW242.

The following describes the control states of the respective switches in the display period Pd of the display device 1b according to the second comparative example with respect to the first embodiment.

As illustrated in FIG. 17, in the display period Pd, each of the switches SW111, SW142, SW221, and SW241 is controlled to be on, and each of the switches SW112, SW141, and SW242 is controlled to be off. As a result, the pixel signal Vpix is applied to the pixel signal wiring 50, and the display drive signal VCOM is applied to the detection electrode wiring 51.

The following describes the control states of the respective switches in the detection period Pt of the display device 1b according to the second comparative example with respect to the first embodiment.

As illustrated in FIG. 17, in the detection period Pt, the switches SW112 and SW141, the switches SW241 corresponding to the non-selected detection electrodes DE, and the switch SW242 corresponding to the selected detection electrode DE are each controlled to be on. In the detection period Pt, the switches SW111, SW142, and SW221, the switch SW241 corresponding to the selected detection electrode DE, and the switches SW242 corresponding to the non-selected detection electrodes DE are each controlled to be off. As a result, the detection input/output signal AFE is applied to a line of the detection electrode wiring 51 corresponding to the selected detection electrode DE, and the guard signal Vgd is applied to lines of the detection electrode wiring 51 corresponding to the non-selected detection electrodes DE.

Specifically, in the detection period Pt1(1,4), the switches SW112 and SW141, the switches SW241(1,3), SW241(1,1), and SW241(1,2) corresponding to the non-selected detection electrodes DE(1,3), DE(1,1), and DE(1,2), and the switch SW242(1,4) corresponding to the selected detection electrode DE(1,4) are each controlled to be on. In the detection period Pt1(1,4), the switches SW111, SW142, and SW221, the switch SW241(1,4) corresponding to the selected detection electrode DE(1,4), and the switches SW242(1,3), SW242(1,1), and SW242(1,2) corresponding to the non-selected detection electrodes DE(1,3), DE(1,1), and DE(1,2) are each controlled to be off.

In the detection period Pt1(1,3), the switches SW112 and SW141, the switches SW241(1,4), SW241(1,1), and SW241(1,2) corresponding to the non-selected detection electrodes DE(1,4), DE(1,1), and DE(1,2), and the switch SW242(1,3) corresponding to the selected detection electrode DE(1,3) are each controlled to be on. In the detection period Pt1(1,3), the switches SW111, SW142, and SW221, the switch SW241(1,3) corresponding to the selected detection electrode DE(1,3), and the switches SW242(1,4), SW242(1,1), and SW242(1,2) corresponding to the non-selected detection electrodes DE(1,4), DE(1,1), and DE(1,2) are each controlled to be off.

In the detection period Pt2(1,2), the switches SW112 and SW141, the switches SW241(1,3), SW241(1,4), and SW241(1,1) corresponding to the non-selected detection electrodes DE(1,3), DE(1,4), and DE(1,1), and the switch SW242(1,2) corresponding to the selected detection electrode DE(1,2) are each controlled to be on. In the detection period Pt2(1,2), the switches SW111, SW142, and SW221, the switch SW241(1,2) corresponding to the selected detection electrode DE(1,2), and the switches SW242(1,3), SW242(1,4), and SW242(1,1) corresponding to the non-selected detection electrodes DE(1,3), DE(1,4), and DE(1,1) are each controlled to be off.

In the detection period Pt2(1,1), the switches SW112 and SW141, the switches SW241(1,3), SW241(1,4), and SW241(1,2) corresponding to the non-selected detection electrodes DE(1,3), DE(1,4), and DE(1,2), and the switch SW242(1,1) corresponding to the selected detection electrode DE(1,1) are each controlled to be on. In the detection period Pt2(1,1), the switches SW111, SW142, and SW221, the switch SW241(1,1) corresponding to the selected detection electrode DE(1,1), and the switches SW242(1,3), SW242(1,4), and SW242(1,2) corresponding to the non-selected detection electrodes DE(1,3), DE(1,4), and DE(1,2) are each controlled to be off.

Figure 18:
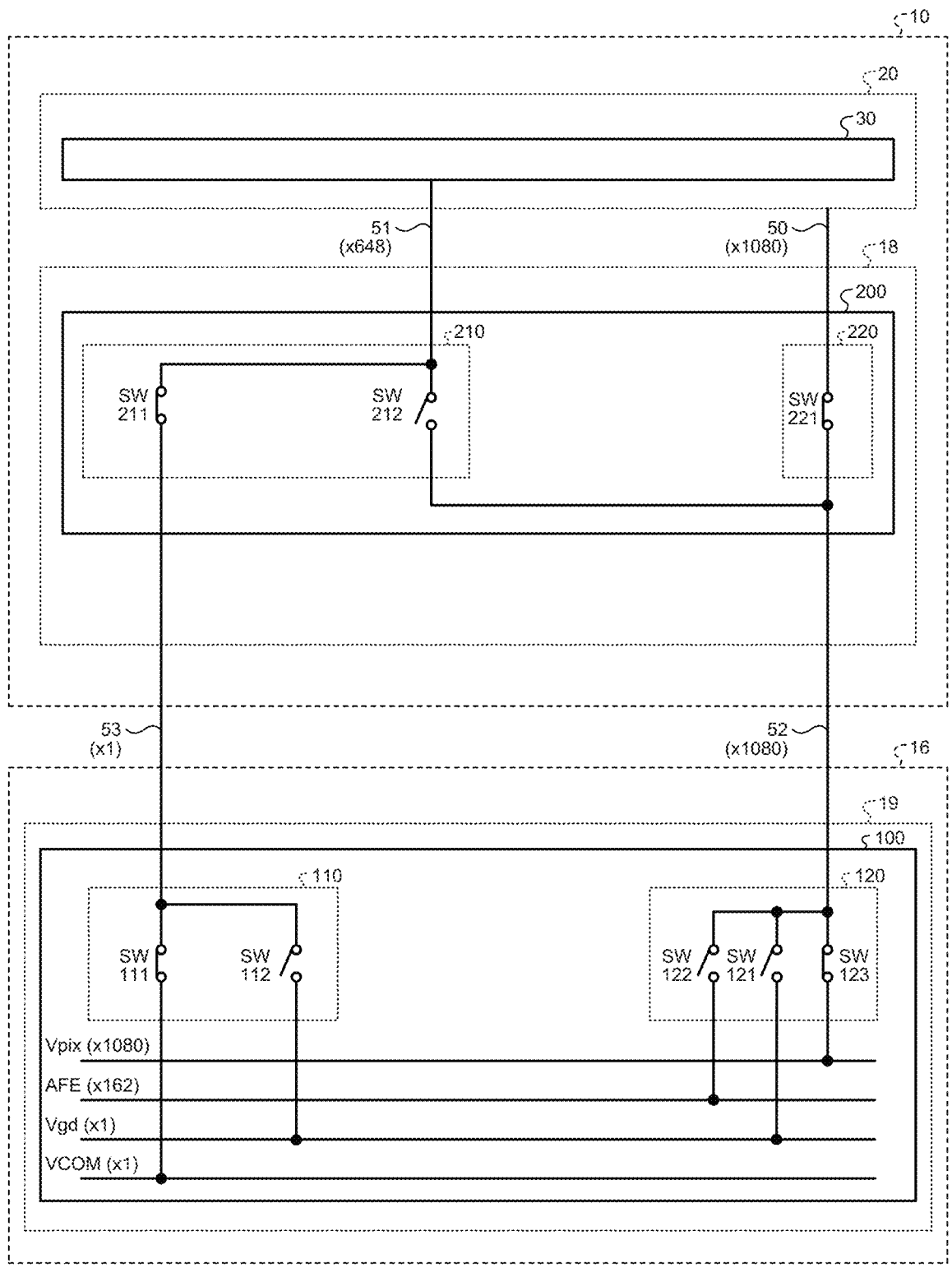
FIG. 18 is a diagram illustrating a configuration of an output circuit and a coupling circuit of the display device according to the first embodiment.
Figure 19:
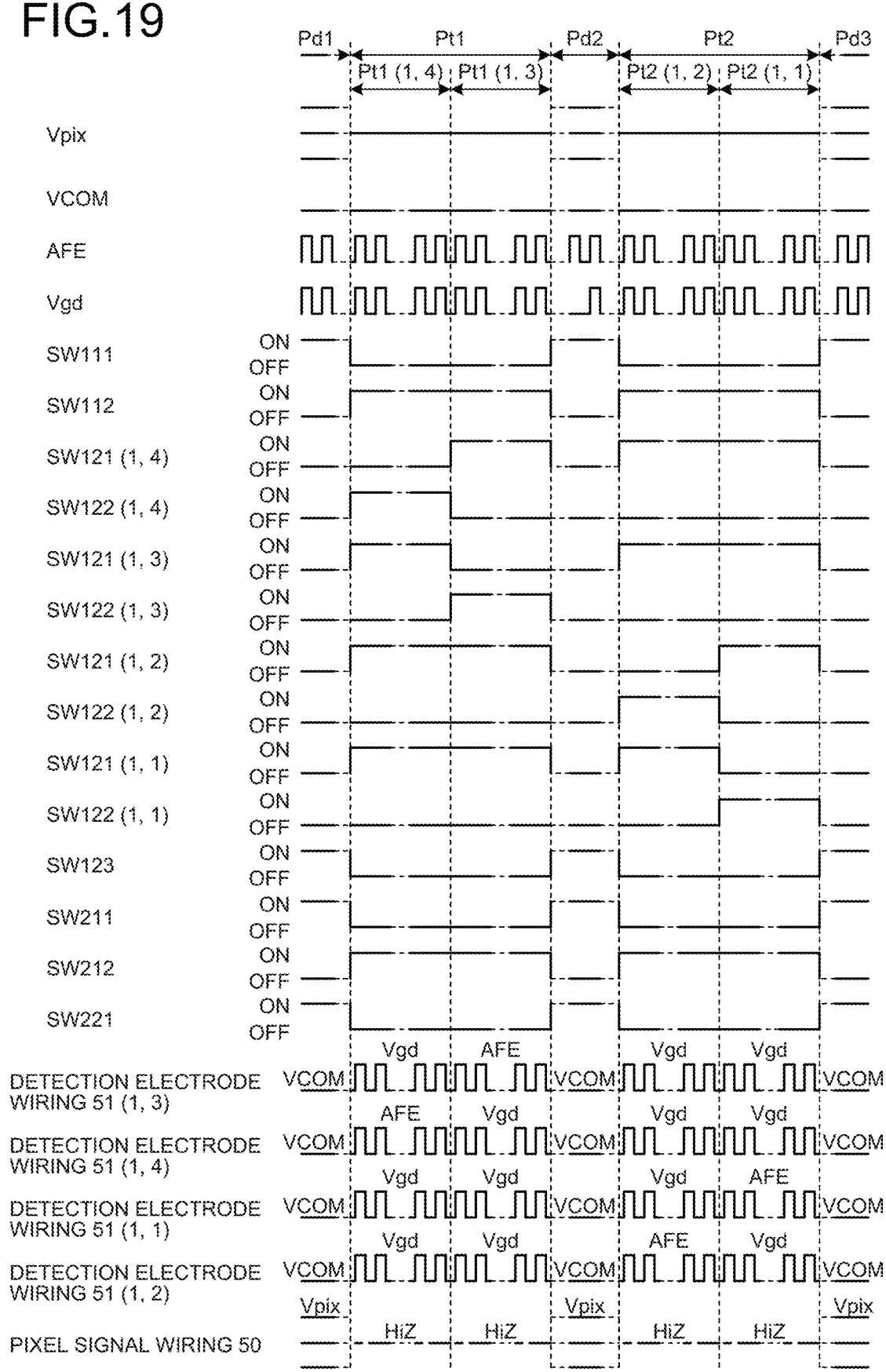
FIG. 19 is a diagram illustrating a timing control example of the display device according to the first embodiment.

FIG. 18 is a diagram illustrating a configuration of the output circuit and the coupling circuit of the display device according to the first embodiment. FIG. 19 is a diagram illustrating a timing control example of the display device according to the first embodiment.

As illustrated in FIG. 18, the output circuit 100 of the display device 1 according to the first embodiment includes the switching circuit 110 and a switching circuit 120. The output circuit 100 includes, for example, a multiplexer.

The switching circuit 110 switches between the display drive signal VCOM and the guard signal Vgd, and outputs the selected signal to the second common wiring 53. The switching circuit 110 includes the switch SW111 and the switch SW112.

The switching circuit 120 switches between the pixel signal Vpix, the guard signal Vgd, and the detection input/output signal AFE, and outputs the selected signal to the first common wiring 52. The switching circuit 120 includes a switch SW121, a switch SW122, and a switch SW123.

As illustrated in FIG. 18, the coupling circuit 200 of the display device 1 according to the first embodiment includes a switching circuit 210 (second switching circuit) and the switching circuit 220 (first switching circuit). The coupling circuit 200 includes, for example, a multiplexer.

The switching circuit 210 (second switching circuit) switches between the display drive signal VCOM or the guard signal Vgd that has been selected by the switching circuit 110 and output to the second common wiring 53 and the pixel signal Vpix or the detection input/output signal AFE output to the first common wiring 52 by the switching circuit 120. The switching circuit 210 (second switching circuit) includes a switch SW211 and a switch SW212.

The switching circuit 220 (first switching circuit) outputs the pixel signal Vpix in a time-division manner to the respective sub-pixels SPix constituting each of the pixels Pix through the pixel signal wiring 50. Herein, for ease of explanation, one switch SW221 is illustrated.

The following describes the control states of the respective switches in the display period Pd of the display device 1 according to the first embodiment.

As illustrated in FIG. 19, in the display period Pd, each of the switches SW111, SW123, SW211, and SW221 is controlled to be on, and each of the switches SW112, SW121, SW122, and SW212 is controlled to be off. As a result, the pixel signal Vpix is applied to the pixel signal wiring 50, and the display drive signal VCOM is applied to the detection electrode wiring 51.

The following describes the control states of the respective switches in the detection period Pt of the display device 1 according to the first embodiment.

As illustrated in FIG. 19, in the detection period Pt, the switches SW112 and SW212, the switches SW121 corresponding to the non-selected detection electrodes DE, and the switch SW122 corresponding to the selected detection electrode DE are each controlled to be on. In the detection period Pt, the switches SW111, SW123, SW211, and SW221, the switch SW121 corresponding to the selected detection electrode DE, and the switches SW122 corresponding to the non-selected detection electrodes DE are each controlled to be off. As a result, the detection input/output signal AFE is applied to a line of the detection electrode wiring 51 corresponding to the selected detection electrode DE, and the guard signal Vgd is applied to lines of the detection electrode wiring 51 corresponding to the non-selected detection electrodes DE.

Specifically, in the detection period Pt1(1,4), the switches SW112 and SW212, the switches SW121(1,3), SW121(1,1), and SW121(1,2) corresponding to the non-selected detection electrodes DE(1,3), DE(1,1), and DE(1,2), and the switch SW122(1,4) corresponding to the selected detection electrode DE(1,4) are each controlled to be on. In the detection period Pt1(1,4), the switches SW111, SW123, SW211, and SW221, the switch SW121(1,4) corresponding to the selected detection electrode DE(1,4), and the switches SW122(1,3), SW122(1,1), and SW122(1,2) corresponding to the non-selected detection electrodes DE(1,3), DE(1,1), and DE(1,2) are each controlled to be off.

In the detection period Pt1(1,3), the switches SW112 and SW212, the switches SW121(1,4), SW121(1,1), and SW121(1,2) corresponding to the non-selected detection electrodes DE(1,4), DE(1,1), and DE(1,2), and the switch SW122(1,3) corresponding to the selected detection electrode DE(1,3) are each controlled to be on. In the detection period Pt1(1,3), the switches SW111, SW123, SW211, and SW221, the switch SW121(1,3) corresponding to the selected detection electrode DE(1,3), and the switches SW122(1,4), SW122(1,1), and SW122(1,2) corresponding to the non-selected detection electrodes DE(1,4), DE(1,1), and DE(1,2) are each controlled to be off.

In the detection period Pt2(1,2), the switches SW112 and SW212, the switches SW121(1,3), SW121(1,4), and SW121(1,1) corresponding to the non-selected detection electrodes DE(1,3), DE(1,4), and DE(1,1), and the switch SW122(1,2) corresponding to the selected detection electrode DE(1,2) are each controlled to be on. In the detection period Pt2(1,2), the switches SW111, SW123, SW211, and SW221, the switch SW121(1,2) corresponding to the selected detection electrode DE(1,2), and the switches SW122(1,3), SW122(1,4), and SW122(1,1) corresponding to the non-selected detection electrodes DE(1,3), DE(1,4), and DE(1,1) are each controlled to be off.

In the detection period Pt2(1,1), the switches SW112 and SW212, the switches SW121(1,3), SW121(1,4), and SW121(1,2) corresponding to the non-selected detection electrodes DE(1,3), DE(1,4), and DE(1,2), and the switch SW122(1,1) corresponding to the selected detection electrode DE(1,1) are each controlled to be on. In the detection period Pt2(1,1), the switches SW111, SW123, SW211, and SW221, the switch SW121(1,1) corresponding to the selected detection electrode DE(1,1), and the switches SW122(1,3), SW122(1,4), and SW122(1,2) corresponding to the non-selected detection electrodes DE(1,3), DE(1,4), and DE(1,2) are each controlled to be off.

In the present embodiment, the configuration has been exemplified in which the switching circuit 110 is included, and the switching circuit 210 (second switching circuit) receives the display drive signal VCOM or the guard signal Vgd selected by the switching circuit 110. However, the configuration may be such that the switching circuit 110 is fixed at the display drive signal VCOM, that is, the display drive signal VCOM is supplied to the switching circuit 210 (second switching circuit) even in the detection period Pt. Alternatively, an aspect may be such that the switching circuit 110 is not provided, and the display drive signal VCOM is supplied to the second common wiring 53.

In the present embodiment, as described above, the pixel signal wiring 50 includes 1080 lines, and the detection electrode wiring 51 includes 648 lines. In this case, an aspect may be such that a plurality of lines of the pixel signal wiring 50 are assigned to each line of the detection electrode wiring 51.

In the configuration according to the first comparative example with respect to the first embodiment, the number of lines of the wiring between the output circuit 100a and the coupling circuit 200a is the same as the total number of lines of the pixel signal wiring 50 and the detection electrode wiring 51. In contrast, in the display device 1 according to the first embodiment, the number of lines of the wiring between the output circuit 100 and the coupling circuit 200, that is, the total number of lines of the first common wiring 52 and the second common wiring 53 can be smaller than the total number of lines of the pixel signal wiring 50 and the detection electrode wiring 51. Specifically, when, for example, the pixel signal wiring 50 includes 1080 lines and the detection electrode wiring 51 includes 648 lines, the number of line of wiring between the output circuit 100a and the coupling circuit 200a is 1728 in the configuration according to the first comparative example with respect to the first embodiment. However, in the display device 1 according to the first embodiment, the number of lines of the wiring between the output circuit 100 and the coupling circuit 200 can be 1081.

In the configuration according to the second comparative example with respect to the first embodiment, the number of lines of the wiring between the output circuit 100b and the coupling circuit 200b is smaller than that in the configuration according to the first comparative example with respect to the first embodiment. However, as described above, in the configuration according to the second comparative example with respect to the first embodiment, the detection input/output signals AFE need to be divided by 18 using the shift register 300 (SR), and the same number of the detection input/output signals AFE as the number of lines of the detection electrode wiring 51 need to be generated. The circuit scale of the multiplexer (not illustrated) for generating a control signal for controlling the switch SW240 of the switching circuit 240 may increase.

With the configuration of the display device 1 according to the first embodiment, the configuration illustrated in FIG. 18 and the timing control illustrated in FIG. 19 allow both the pixel signal Vpix that is supplied to the pixel Pix and the detection input/output signal AFE that is supplied to the detection electrode DE to be transmitted through the first common wiring 52. Specifically, the pixel signal Vpix is supplied through the first common wiring 52 in the display period Pd, and the detection input/output signal AFE is supplied through the first common wiring 52 in the detection period Pt. The pixel signal Vpix is applied to the pixel signal wiring 50 in the display period Pd, and the detection input/output signal AFE is applied to the detection electrode wiring 51 in the detection period Pt. This configuration can reduce the number of lines of the wiring coupled to the display panel 10, and can reduce the width of the peripheral region 18 outside the display region 20 and the width of the coupling portion between the display panel 10 and the circuit board 16.

Modification of First Embodiment

Figure 20:
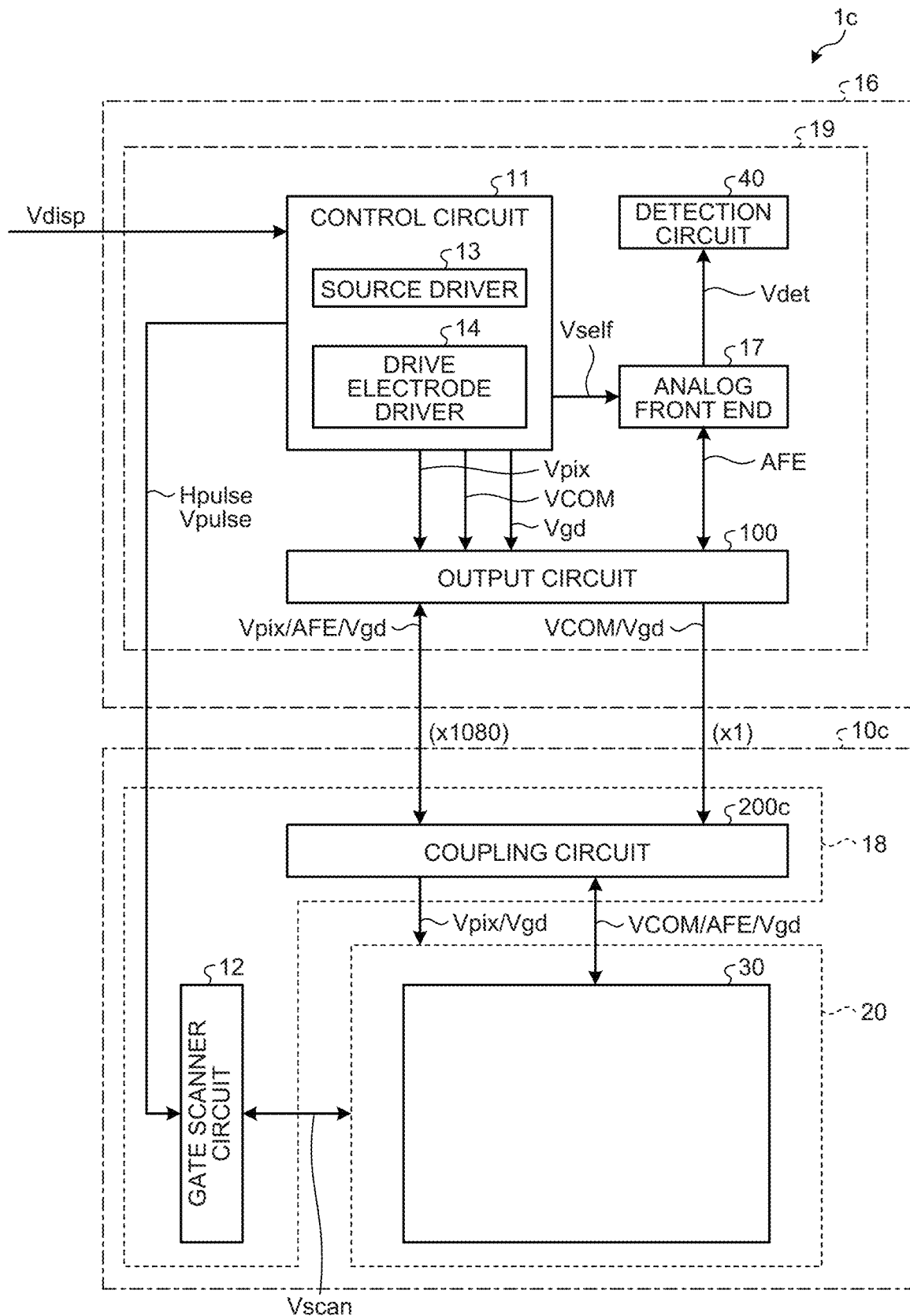
FIG. 20 is a block diagram illustrating a configuration example of a display device according to a modification of the first embodiment.
Figure 21:
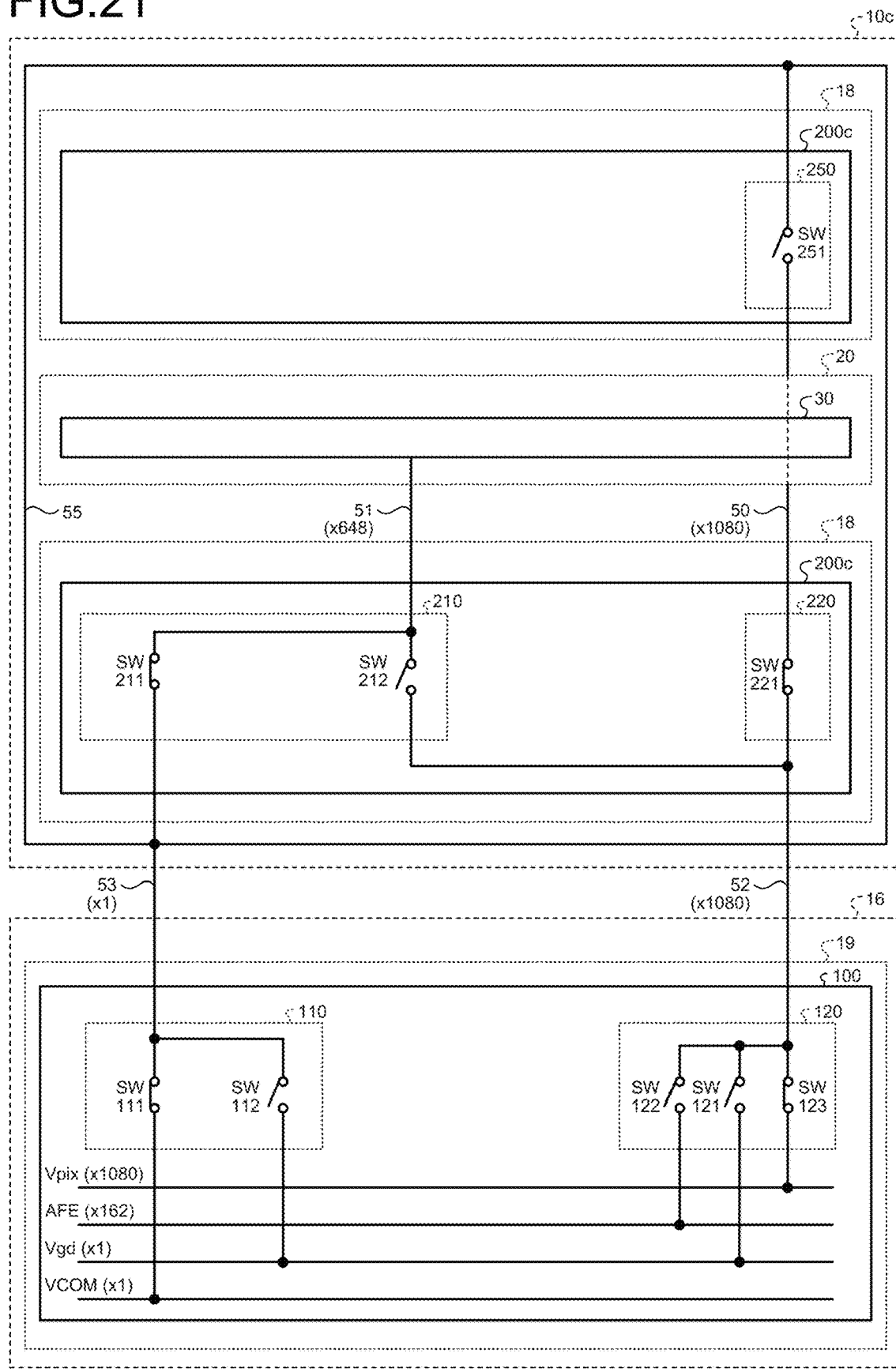
FIG. 21 is a diagram illustrating a configuration of the output circuit and a coupling circuit of the display device according to the modification of the first embodiment.
Figure 22:
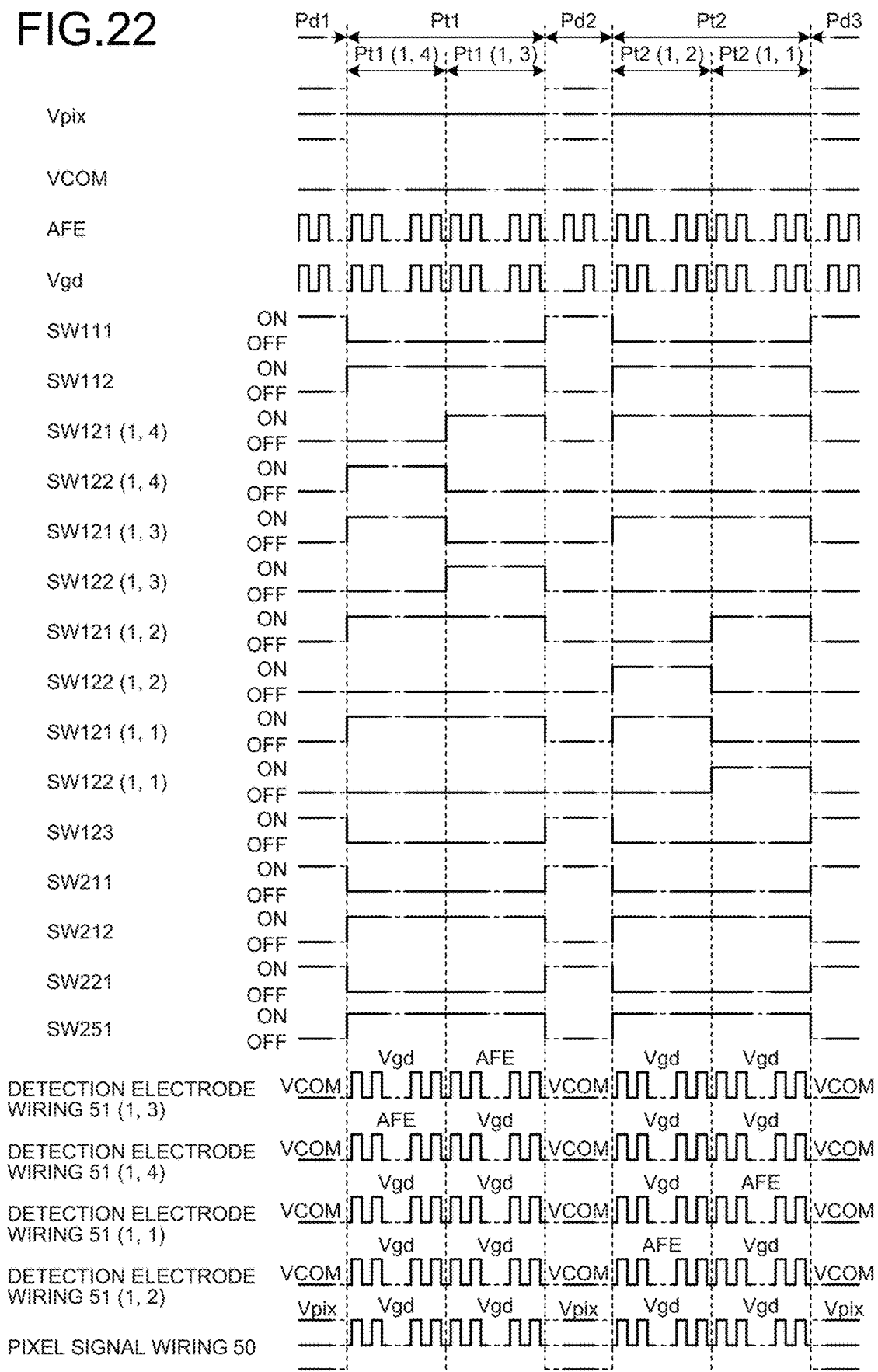
FIG. 22 is a diagram illustrating a timing control example of the display device according to the modification of the first embodiment.

FIG. 20 is a block diagram illustrating a configuration example of a display device according to a modification of the first embodiment. FIG. 21 is a diagram illustrating a configuration of the output circuit and a coupling circuit of the display device according to the modification of the first embodiment. FIG. 22 is a diagram illustrating a timing control example of the display device according to the modification of the first embodiment. The output circuit 100 of a display device 1c according to the modification of the first embodiment is the same as that of the display device 1 according to the first embodiment, and therefore, will not be described below.

As illustrated in FIG. 21, in the display device 1c according to the modification of the first embodiment, the display drive signal VCOM or the guard signal Vgd selected by the switching circuit 110 is supplied to the outer frame wiring 55 provided in the peripheral region 18.

As illustrated in FIG. 21, a coupling circuit 200c of the display device 1c according to the modification of the first embodiment further includes a switching circuit 250 (third switching circuit) in addition to the above-described configuration of the display device 1 according to the first embodiment.

The switching circuit 250 (third switching circuit) couples the display drive signal VCOM or the guard signal Vgd selected by the switching circuit 110 to the pixel signal wiring 50. The switching circuit 250 (third switching circuit) includes a switch SW251. The switches SW251 are provided so as to correspond to the sub-pixels SPix constituting each of the pixels Pix. Herein, however, for ease of explanation, one of the switches SW251 is illustrated.

As illustrated in FIG. 22, the switch SW251 is controlled to be off in the display period Pd, and controlled to be on in the detection period Pt. As a result, the guard signal Vgd is applied to the pixel signal wiring 50 in the detection period Pt.

With the configuration of the first embodiment described above, the pixel signal wiring 50 is placed in the floating state and is set to high impedance HiZ in the detection period Pt (refer to FIG. 19).

In the display device 1 according to the first embodiment, when a standby state continues in which no screen display is made, the potential of the pixel signal wiring 50 set to the high impedance HiZ is varied by a leak current generated between the pixel signal wiring 50 and the gate of the switching element TrD of each of the sub-pixel SPix, and what is called burn-in may occur. With the configuration of the first comparative example with respect to the first embodiment illustrated in FIGS. 12 to 14, the pixel signal wiring 50 can be avoided from being in the floating state by controlling the switch SW231 of the switching circuit 230 (first switching circuit) in the detection period Pt to be on.

With the configuration of the first embodiment, the detection input/output signal AFE is applied to the first common wiring 52 in the detection period Pt. As a result, when the switch SW221 of the switching circuit 220 (first switching circuit) is controlled to be on in the detection period Pt, the detection input/output signal AFE is supplied to the pixel signal wiring 50, and the accuracy of the touch detection may decrease. With the configuration of the first embodiment, as a method for restraining the occurrence of the burn-in, it is conceivable to turn on the switch SW221 of the switching circuit 220 (first switching circuit) at predetermined intervals of time when the standby state is established in which no screen display is made.

In the display device 1c according to the modification of the first embodiment, the switch SW251 is controlled to be on in the detection period Pt. As a result, the pixel signal wiring 50 can be avoided from being in the floating state, and the burn-in can be prevented from occurring in the standby state in which no screen display is made.

As described above, the display device 1 according to the first embodiment includes the display panel 10 provided with the display region 20 including the pixels Pix and with the detection electrodes. The display panel 10 includes the lines of the first common wiring 52 each of which transmits the pixel signal Vpix to be supplied to the pixel Pix or the detection input/output signal AFE to be supplied to the detection electrode DE, the pixel signal wiring 50 electrically coupled to the pixels Pix, the detection electrode wiring 51 electrically coupled to the detection electrodes DE, the switching circuit 220 (first switching circuit) that electrically couples or uncouples the first common wiring 52 to or from the pixel signal wiring 50, and the switching circuit 210 (second switching circuit) that electrically couples or uncouples the first common wiring 52 to or from the detection electrode wiring 51.

In the above-described configuration, the pixel signal Vpix is transmitted to the first common wiring 52 in the display period Pd, and the detection input/output signal AFE is transmitted to the first common wiring 52 in the detection period Pt. The switching circuit 220 (first switching circuit) applies the pixel signal Vpix to the pixel signal wiring 50 in the display period Pd. The switching circuit 210 (second switching circuit) applies the detection input/output signal AFE to the detection electrode wiring 51 in the detection period Pt.

The display device 1 according to the first embodiment includes the second common wiring 53 that transmits the display drive signal VCOM to be supplied to the detection electrode DE. The switching circuit 210 (second switching circuit) electrically couples or uncouples the second common wiring 53 to or from the detection electrode DE, and applies the display drive signal VCOM to the detection electrode wiring 51 in the display period Pd.

In the above-described configuration, the detection input/output signal AFE or the guard signal Vgd is transmitted to the first common wiring 52 in the detection period Pt. The switching circuit 210 (second switching circuit) applies the detection input/output signal AFE or the guard signal Vgd to the detection electrode wiring 51 in the detection period Pt.

The display device 1 according to the first embodiment can transmit, through the first common wiring 52, both the pixel signal Vpix to be supplied to the pixel Pix and the detection input/output signal AFE to be supplied to the detection electrode DE. This configuration can reduce the number of lines of the wiring coupled to the display panel 10, and can reduce the width of the peripheral region 18 outside the display region 20 and the width of the coupling portion between the display panel 10 and the circuit board 16.

In the display device 1c according to the modification of the first embodiment, the outer frame wiring 55 electrically coupled to the second common wiring 53 is provided in the peripheral region 18 outside the display region 20. The coupling circuit 200c further includes the switching circuit 250 (third switching circuit) that electrically couples or uncouples the outer frame wiring 55 to or from the pixel signal wiring 50. The switching circuit 250 (third switching circuit) applies the guard signal Vgd to the pixel signal wiring 50 in the detection period Pt.

With the display device 1c according to the modification of the first embodiment, the pixel signal wiring 50 can be avoided from being in the floating state, and the burn-in can be prevented from occurring in the standby state in which no screen display is made.

The present embodiment can provide the display devices 1 and 1c that can reduce the number of lines of the wiring coupled to the display panels 10 and 10c.

Second Embodiment

Hereinafter, components having the same functions as those of the above-described first embodiment will be given the same reference numerals as those in the first embodiment, and will not be described below. A display device of a second embodiment will be described mainly in terms of differences from the first embodiment.

Figure 23:
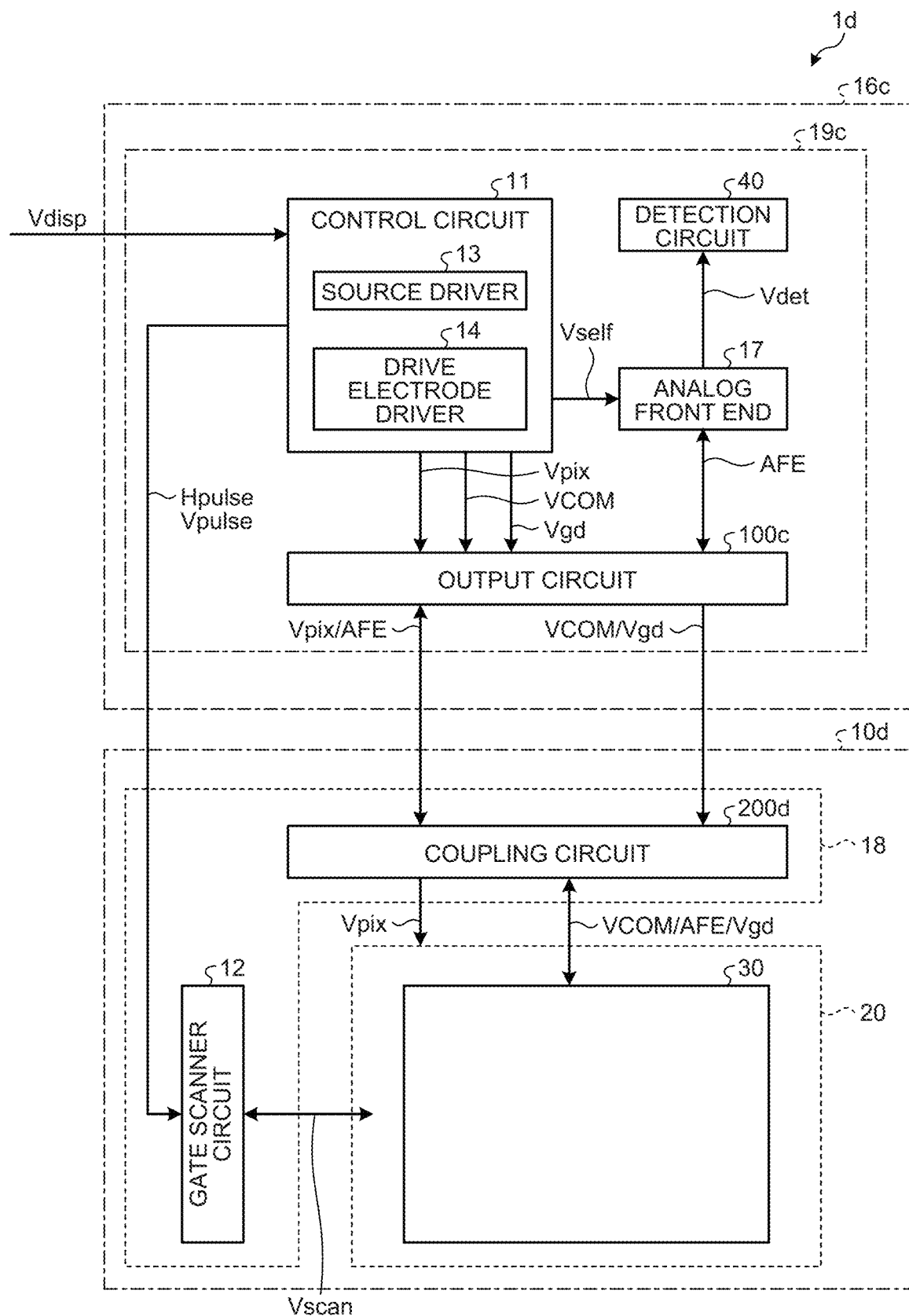
FIG. 23 is a block diagram illustrating a configuration example of a display device according to a second embodiment.
Figure 24:
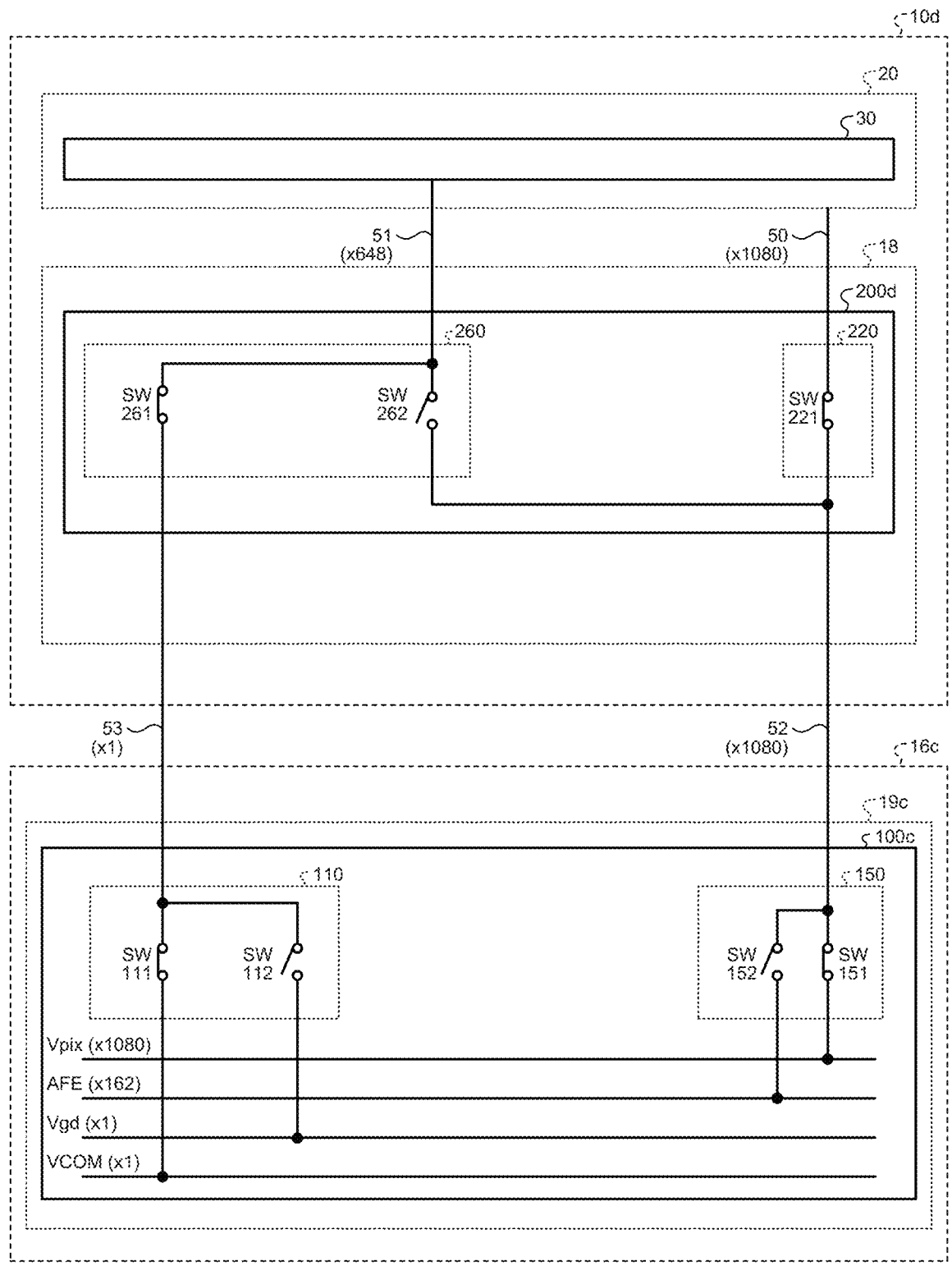
FIG. 24 is a diagram illustrating a configuration of an output circuit and a coupling circuit of the display device according to the second embodiment.
Figure 25:
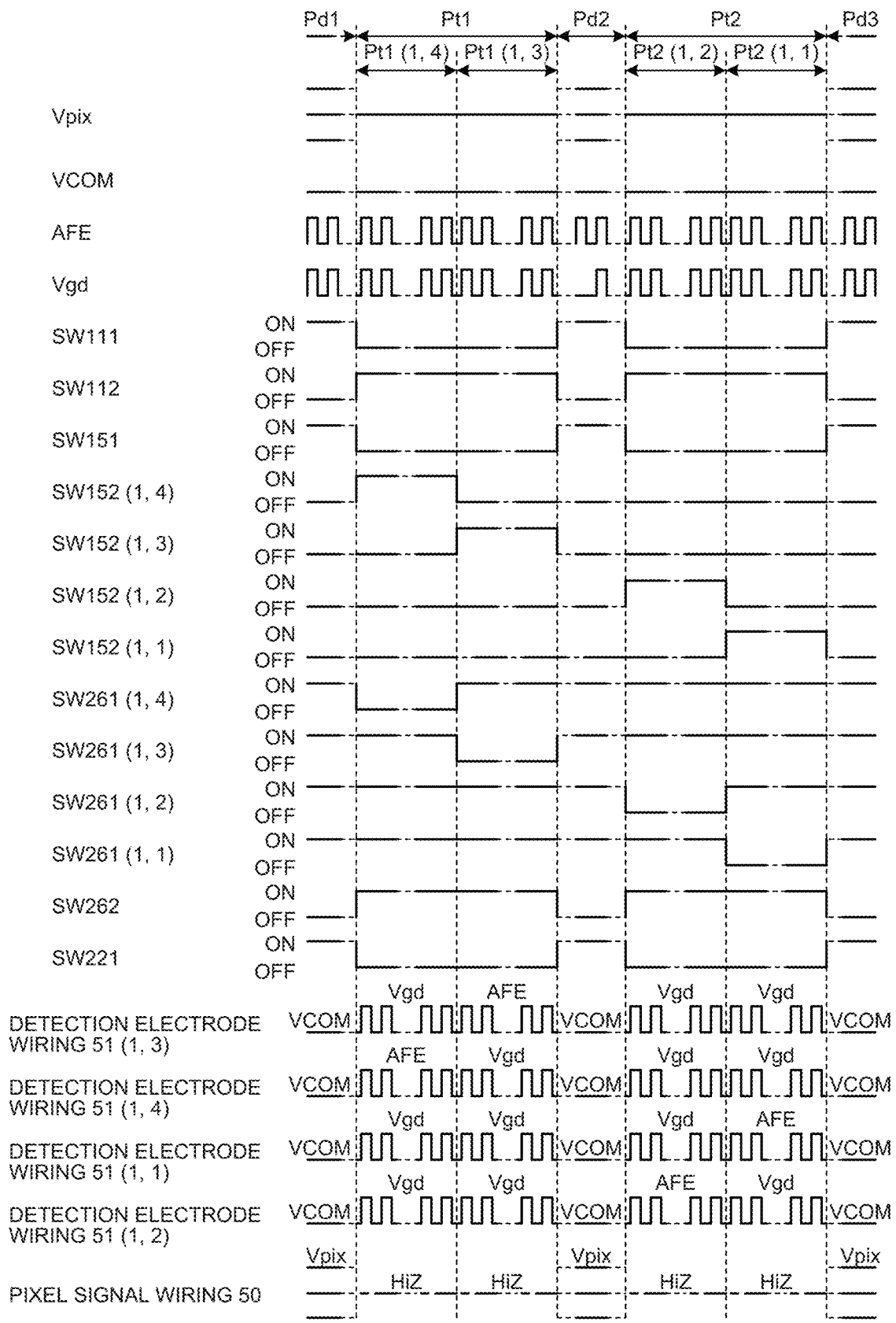
FIG. 25 is a diagram illustrating a timing control example of the display device according to the second embodiment.

FIG. 23 is a block diagram illustrating a configuration example of the display device according to the second embodiment. FIG. 24 is a diagram illustrating a configuration of an output circuit and a coupling circuit of the display device according to the second embodiment. FIG. 25 is a diagram illustrating a timing control example of the display device according to the second embodiment.

As illustrated in FIG. 24, an output circuit 100c of a display device 1d according to the second embodiment includes the switching circuit 110 and a switching circuit 150. The output circuit 100c includes, for example, a multiplexer.

The switching circuit 150 switches between the pixel signal Vpix and the detection input/output signal AFE, and outputs the selected signal to the first common wiring 52. The switching circuit 150 includes a switch SW151 and a switch SW152.

As illustrated in FIG. 24, a coupling circuit 200d of the display device 1d according to the second embodiment includes a switching circuit 260 (second switching circuit) and the switching circuit 220 (first switching circuit). The coupling circuit 200d includes, for example, a multiplexer.

The switching circuit 260 (second switching circuit) switches between the display drive signal VCOM or the guard signal Vgd that has been selected by the switching circuit 110 and has been output to the second common wiring 53 and the detection input/output signal AFE output to the first common wiring 52 by the switching circuit 150. The switching circuit 260 (second switching circuit) includes a switch SW261 and a switch SW262.

The following describes the control states of the respective switches in the display period Pd of the display device 1d according to the second embodiment.

As illustrated in FIG. 25, in the display period Pd, the switches SW111, SW151, SW261, and SW221 are controlled to be on, and the switches SW112, SW152, and SW262 are controlled to be off. As a result, the pixel signal Vpix is applied to the pixel signal wiring 50, and the display drive signal VCOM is applied to the detection electrode wiring 51.

The following describes the control states of the respective switches in the detection period Pt of the display device 1d according to the second embodiment.

As illustrated in FIG. 25, in the detection period Pt, the switch SW112, the switches SW261 corresponding to the non-selected detection electrodes DE, and the switch SW152 corresponding to the selected detection electrode DE are each controlled to be on. In the detection period Pt, the switches SW111, SW151, and SW221, the switch SW261 corresponding to the selected detection electrode DE, and the switches SW152 corresponding to the non-selected detection electrodes DE are each controlled to be off. As a result, the detection input/output signal AFE is applied to a line of the detection electrode wiring 51 corresponding to the selected detection electrode DE, and the guard signal Vgd is applied to lines of the detection electrode wiring 51 corresponding to the non-selected detection electrodes DE.

Specifically, in the detection period Pt1(1,4), the switch SW112, the switches SW261(1,3), SW261(1,1), and SW261(1,2) corresponding to the non-selected detection electrodes DE(1,3), DE(1,1), and DE(1,2), and the switch SW152(1,4) corresponding to the selected detection electrode DE(1,4) are each controlled to be on. In the detection period Pt1(1,4), the switches SW111, SW151, and SW221, the switch SW261(1,4) corresponding to the selected detection electrode DE(1,4), and the switches SW152(1,3), SW152(1,1), and SW152(1,2) corresponding to the non-selected detection electrodes DE(1,3), DE(1,1), and DE(1,2) are each controlled to be off.

In the detection period Pt1(1,3), the switch SW112, the switches SW261(1,4), SW261(1,1), and SW261(1,2) corresponding to the non-selected detection electrodes DE(1,4), DE(1,1), and DE(1,2), and the switch SW152(1,3) corresponding to the selected detection electrode DE(1,3) are each controlled to be on. In the detection period Pt1(1,3), the switches SW111, SW151, and SW221, the switch SW261(1,3) corresponding to the selected detection electrode DE(1,3), and the switches SW152(1,4), SW152(1,1), and SW152(1,2) corresponding to the non-selected detection electrodes DE(1,4), DE(1,1), and DE(1,2) are each controlled to be off.

In the detection period Pt2(1,2), the switch SW112, the switches SW261(1,3), SW261(1,4), and SW261(1,1) corresponding to the non-selected detection electrodes DE(1,3), DE(1,4), and DE(1,1), and the switch SW152(1,2) corresponding to the selected detection electrode DE(1,2) are each controlled to be on. In the detection period Pt2(1,2), the switches SW111, SW151, and SW221, the switch SW261(1,2) corresponding to the selected detection electrode DE(1,2), and the switches SW152(1,3), SW152(1,4), and SW152(1,1) corresponding to the non-selected detection electrodes DE(1,3), DE(1,4), and DE(1,1) are each controlled to be off.

In the detection period Pt2(1,1), the switch SW112, the switches SW261(1,3), SW261(1,4), and SW261(1,2) corresponding to the non-selected detection electrodes DE(1,3), DE(1,4), and DE(1,2), and the switch SW152(1,1) corresponding to the selected detection electrode DE(1,1) are each controlled to be on. In the detection period Pt2(1,1), the switches SW111, SW151, and SW221, the switch SW261 (1,1) corresponding to the selected detection electrode DE(1, 1), and the switches SW152(1,3), SW152(1,4), and SW152 (1,2) corresponding to the non-selected detection electrodes DE(1,3), DE(1,4), and DE(1,2) are each controlled to be off.

Also in the display device 1d according to the second embodiment, the configuration can be such that the burn-in is prevented from occurring in the standby state in which no screen display is made, in the same way as the configuration according to the modification of the first embodiment. Specifically, the configuration further includes the switching circuit 250 (third switching circuit). The display drive signal VCOM or the guard signal Vgd selected by the switching circuit 110 is supplied to the outer frame wiring 55 provided in the peripheral region 18, and the switch SW251 is controlled to be on in the detection period Pt. This configuration allows the pixel signal wiring 50 to avoid from being in the floating state.

With the configuration of the display device 1d according to the second embodiment, the configuration illustrated in FIG. 24 and the timing control illustrated in FIG. 25 allow both the pixel signal Vpix that is supplied to the pixel Pix and the detection input/output signal AFE that is supplied to the detection electrode DE to be transmitted through the first common wiring 52. Specifically, the pixel signal Vpix is supplied through the first common wiring 52 in the display period Pd, and the detection input/output signal AFE is supplied through the first common wiring 52 in the detection period Pt. The pixel signal Vpix is applied to the pixel signal wiring 50 in the display period Pd, and the detection input/output signal AFE is applied to the detection electrode wiring 51 in the detection period Pt. This configuration can reduce the number of lines of the wiring coupled to a display panel 10d, and can reduce the width of the peripheral region 18 outside the display region 20 and the width of the coupling portion between the display panel 10d and a circuit board 16c.

As described above, the display device 1d according to the second embodiment includes the display panel 10d provided with the display region 20 including the pixels Pix and with the detection electrodes. The display panel 10d includes the lines of the first common wiring 52 each of which transmits the pixel signal Vpix to be supplied to the pixel Pix or the detection input/output signal AFE to be supplied to the detection electrode DE, the second common wiring 53 transmitting the display drive signal VCOM to be supplied to the detection electrode DE and the guard signal Vgd synchronized with the detection input/output signal AFE, the pixel signal wiring 50 electrically coupled to the pixels Pix, the detection electrode wiring 51 electrically coupled to the detection electrodes DE, the switching circuit 220 (first switching circuit) that electrically couples or uncouples the first common wiring 52 to or from the pixel signal wiring 50, and the switching circuit 260 (second switching circuit) that electrically couples or uncouples the first common wiring 52 to or from the detection electrode wiring 51 and electrically couples or uncouples the second common wiring 53 to or from the detection electrode wiring 51.

In the above-described configuration, the pixel signal Vpix is transmitted to the first common wiring 52 in the display period Pd, and the detection input/output signal AFE is transmitted to the first common wiring 52 in the detection period Pt. The display drive signal VCOM is transmitted to the second common wiring 53 in the display period Pd, and the guard signal Vgd is transmitted to the second common wiring 53 in the detection period Pt. The switching circuit 220 (first switching circuit) applies the pixel signal Vpix to the pixel signal wiring 50 in the display period Pd, and applies the detection input/output signal AFE or the guard signal Vgd to the detection electrode wiring 51 in the detection period Pt. The switching circuit 210 (second switching circuit) applies the display drive signal VCOM to the detection electrode wiring 51 in the display period Pd, and applies the detection input/output signal AFE or the guard signal Vgd to the detection electrode wiring 51 in the detection period Pt.

The display device 1d according to the second embodiment can transmit, through the first common wiring 52, both the pixel signal Vpix to be supplied to the pixel Pix and the detection input/output signal AFE to be supplied to the detection electrode DE. This configuration can reduce the number of lines of the wiring coupled to the display panel 10d, and can reduce the width of the peripheral region 18 outside the display region 20 and the width of the coupling portion between the display panel 10d and the circuit board 16c.

The present embodiment can provide the display device 1d that can reduce the number of lines of the wiring coupled to the display panel 10d.

Third Embodiment

Hereinafter, components having the same functions as those of the above-described first or second embodiment will be given the same reference numerals as those in the first or second embodiment, and will not be described below. A display device of a third embodiment will be described mainly in terms of differences from the first embodiment.

Figure 26:
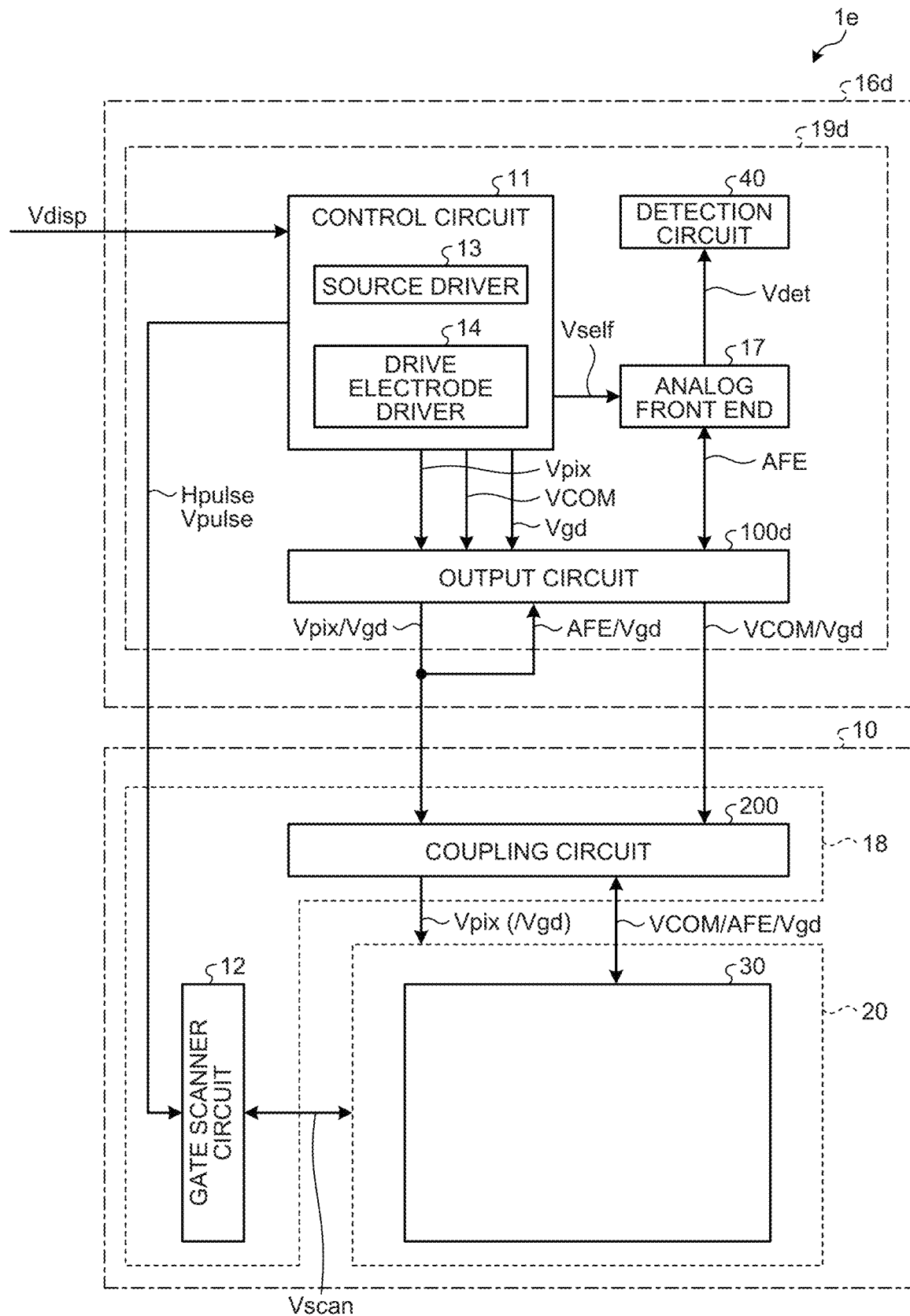
FIG. 26 is a block diagram illustrating a configuration example of a display device according to a third embodiment.
Figure 27:
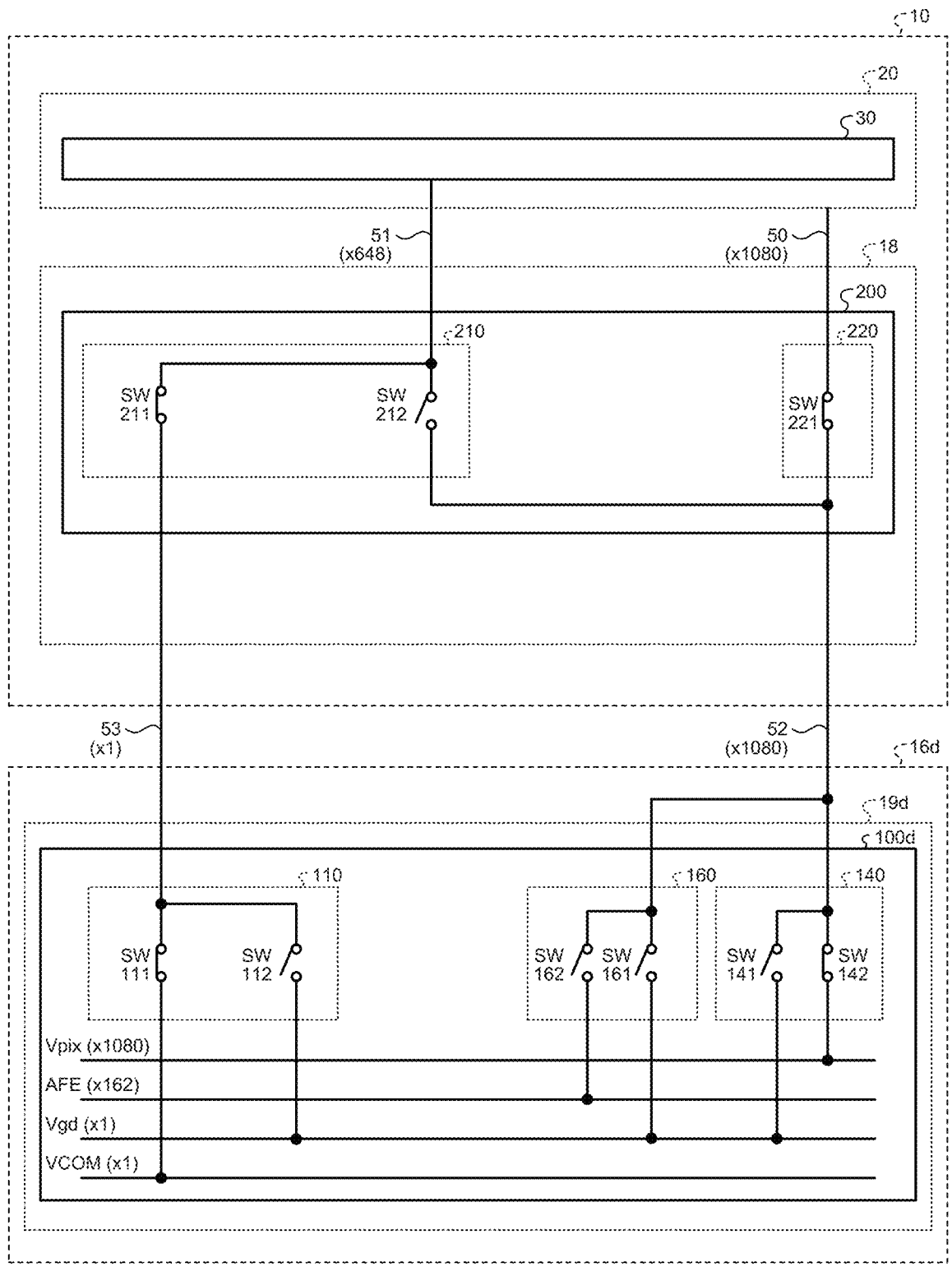
FIG. 27 is a diagram illustrating a configuration of an output circuit and the coupling circuit of the display device according to the third embodiment.
Figure 28:
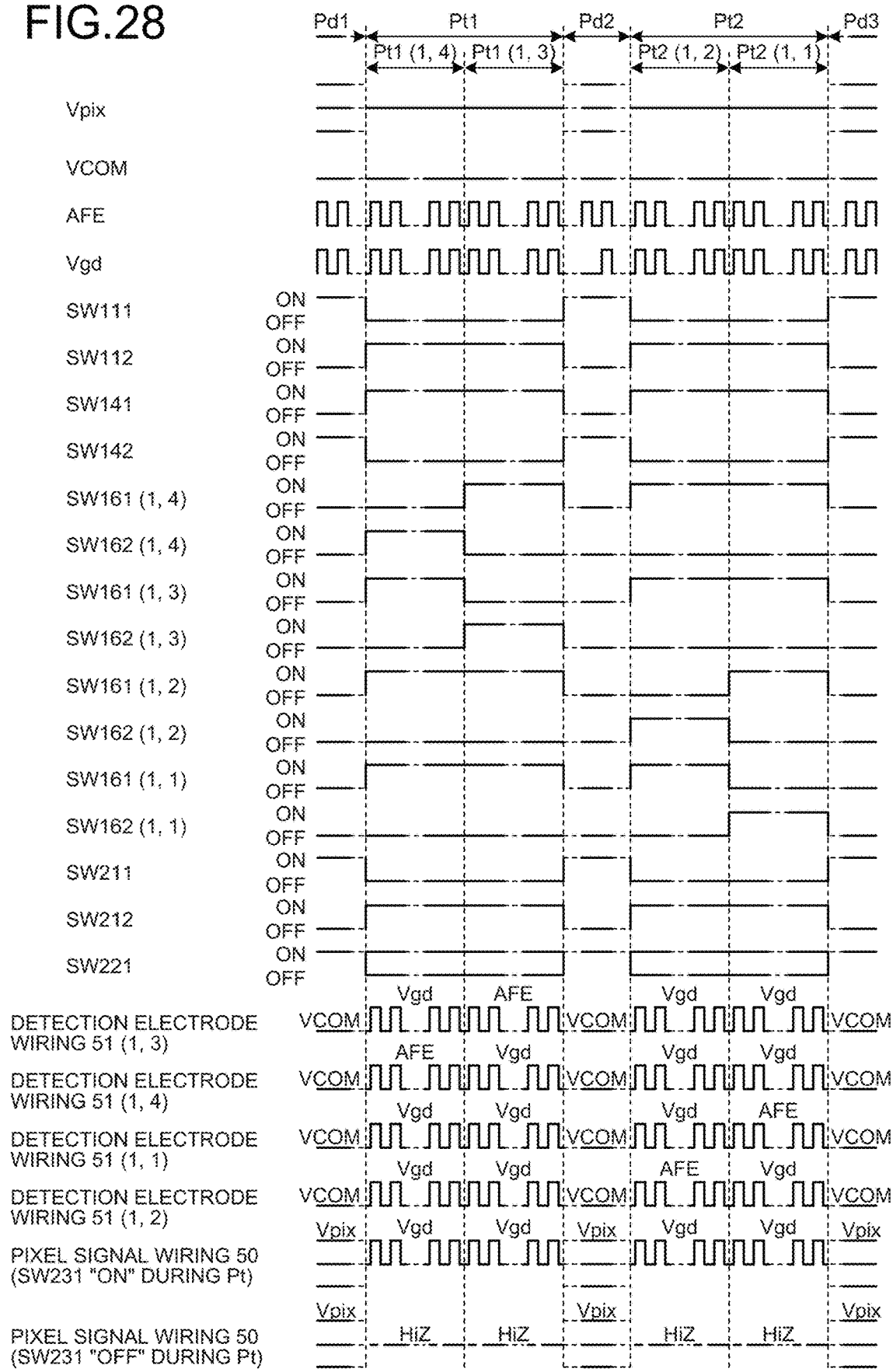
FIG. 28 is a diagram illustrating a timing control example of the display device according to the third embodiment.

FIG. 26 is a block diagram illustrating a configuration example of the display device according to the third embodiment. FIG. 27 is a diagram illustrating a configuration of an output circuit and the coupling circuit of the display device according to the third embodiment. FIG. 28 is a diagram illustrating a timing control example of the display device according to the third embodiment.

As illustrated in FIG. 27, an output circuit 100d of a display device 1e according to the third embodiment includes the switching circuit 110 and a switching circuit 160. The output circuit 100d includes, for example, a multiplexer.

The switching circuit 160 switches between the guard signal Vgd and the detection input/output signal AFE. The switching circuit 160 includes a switch SW161 and a switch SW162. In the present embodiment, the guard signal Vgd or the detection input/output signal AFE selected by the switching circuit 160 is supplied to the first common wiring 52 in a circuit board 16d.

The following describes the control states of the respective switches in the display period Pd of the display device 1e according to the third embodiment.

As illustrated in FIG. 28, in the display period Pd, the switches SW111, SW211, and SW221 are controlled to be on, and the switches SW112, SW161, SW162, and SW212 are controlled to be off. As a result, the pixel signal Vpix is applied to the pixel signal wiring 50, and the display drive signal VCOM is applied to the detection electrode wiring 51.

The following describes the control states of the respective switches in the detection period Pt of the display device 1e according to the third embodiment.

As illustrated in FIG. 28, in the detection period Pt, the switches SW112 and SW212, the switches SW161 corresponding to the non-selected detection electrodes DE, and the switch SW162 corresponding to the selected detection electrode DE are each controlled to be on, and the switches SW111 and SW211, the switch SW161 corresponding to the selected detection electrode DE, and the switches SW162 corresponding to the non-selected detection electrodes DE are each controlled to be off. As a result, the detection input/output signal AFE is applied to a line of the detection electrode wiring 51 corresponding to the selected detection electrode DE, and the guard signal Vgd is applied to lines of the detection electrode wiring 51 corresponding to the non-selected detection electrodes DE.

Specifically, in the detection period Pt1(1,4), the switches SW112 and SW212, the switches SW161(1,3), SW161(1,1), and SW161(1,2) corresponding to the non-selected detection electrodes DE(1,3), DE(1,1), and DE(1,2), and the switch SW162(1,4) corresponding to the selected detection electrode DE(1,4) are each controlled to be on. In the detection period Pt1(1,4), the switches SW111 and SW211, the switch SW161(1,4) corresponding to the selected detection electrode DE(1,4), and the switches SW162(1,3), SW162(1,1), and SW162(1,2) corresponding to the non-selected detection electrodes DE(1,3), DE(1,1), and DE(1,2) are each controlled to be off.

In the detection period Pt1(1,3), the switches SW112 and SW212, the switches SW161(1,4), SW161(1,1), and SW161(1,2) corresponding to the non-selected detection electrodes DE(1,4), DE(1,1), and DE(1,2), and the switch SW162(1,4) corresponding to the selected detection electrode DE(1,3) are each controlled to be on. In the detection period Pt1(1,3), the switches SW111 and SW211, the switch SW161(1,3) corresponding to the selected detection electrode DE(1,3), and the switches SW162(1,4), SW162(1,1), and SW162(1,2) corresponding to the non-selected detection electrodes DE(1,4), DE(1,1), and DE(1,2) are each controlled to be off.

In the detection period Pt2(1,2), the switches SW112 and SW212, the switches SW161(1,3), SW161(1,4), and SW161(1,1) corresponding to the non-selected detection electrodes DE(1,3), DE(1,4), and DE(1,1), and the switch SW162(1,2) corresponding to the selected detection electrode DE(1,2) are each controlled to be on. In the detection period Pt2(1,2), the switches SW111 and SW211, the switch SW161(1,2) corresponding to the selected detection electrode DE(1,2), and the switches SW162(1,3), SW162(1,4), and SW162(1,1) corresponding to the non-selected detection electrodes DE(1,3), DE(1,4), and DE(1,1) are each controlled to be off.

In the detection period Pt2(1,1), the switches SW112 and SW212, the switches SW161(1,3), SW161(1,4), and SW161(1,2) corresponding to the non-selected detection electrodes DE(1,3), DE(1,4), and DE(1,2), and the switch SW162(1,1) corresponding to the selected detection electrode DE(1,1) are each controlled to be on. In the detection period Pt2(1,1), the switches SW111 and SW211, the switch SW161(1,1) corresponding to the selected detection electrode DE(1,1), and the switches SW162(1,3), SW162(1,4), and SW162(1,2) corresponding to the non-selected detection electrodes DE(1,3), DE(1,4), and DE(1,2) are each controlled to be off.

Also in the display device 1e according to the third embodiment, the configuration may be such that the switching circuit 110 is fixed at the display drive signal VCOM, that is, the display drive signal VCOM is supplied to the switching circuit 210 (second switching circuit) even in the detection period Pt. Alternatively, an aspect may be such that the switching circuit 110 is not provided, and the display drive signal VCOM is supplied to the second common wiring 53.

In this case, the switch SW161 corresponds to the switch SW132 in the first comparative example with respect to the first embodiment, and the switch SW162 corresponds to the switch SW133 in the first comparative example with respect to the first embodiment. In the third embodiment, there is not provided any switch corresponding to the switch SW141 of the first comparative example with respect to the first embodiment. Since the present embodiment has the configuration in which the detection input/output signal AFE or the guard signal Vgd selected by the switching circuit 160 is applied to the first common wiring 52 in the detection period Pt, no switch corresponding to the switch SW141 is required. Hence, according to a modification of the third embodiment, the output circuit 100d of the display device 1e can be replaced with the output circuit 100a of the display device 1a according to the first comparative example with respect to the first embodiment. That is, the display device 1e according to the modification of the third embodiment can be configured by using a drive circuit 19a of the display device 1a according to the first comparative example with respect to the first embodiment also as a drive circuit 19d.

The configuration can be such that the burn-in is prevented from occurring in the standby state in which no screen display is made, in the same way as the configuration according to the modification of the first embodiment. Specifically, the configuration further includes the switching circuit 250 (third switching circuit). The display drive signal VCOM or the guard signal Vgd selected by the switching circuit 110 is supplied to the outer frame wiring 55 provided in the peripheral region 18, and the switch SW251 is controlled to be on in the detection period Pt. This configuration allows the pixel signal wiring 50 to avoid from being in the floating state.

With the configuration of the display device 1e according to the third embodiment, the configuration illustrated in FIG. 27 and the timing control illustrated in FIG. 28 allow both the pixel signal Vpix that is supplied to the pixel Pix and the detection input/output signal AFE that is supplied to the detection electrode DE to be transmitted through the first common wiring 52. Specifically, the pixel signal Vpix is supplied through the first common wiring 52 in the display period Pd, and the detection input/output signal AFE is supplied through the first common wiring 52 in the detection period Pt. The pixel signal Vpix is applied to the pixel signal wiring 50 in the display period Pd, and the detection input/output signal AFE is applied to the detection electrode wiring 51 in the detection period Pt. This configuration can reduce the number of lines of the wiring coupled to the display panel 10, and can reduce the width of the peripheral region 18 outside the display region 20 and the width of the coupling portion between the display panel 10 and the circuit board 16d.

As described above, the display device 1e according to the third embodiment includes the display panel 10 provided with the display region 20 including the pixels Pix and with the detection electrodes. The display panel 10 includes the lines of the first common wiring 52 each of which transmits the pixel signal Vpix to be supplied to the pixel Pix or the detection input/output signal AFE to be supplied to the detection electrode DE, the pixel signal wiring 50 electrically coupled to the pixels Pix, the detection electrode wiring 51 electrically coupled to the detection electrodes DE, the switching circuit 220 (first switching circuit) that electrically couples or uncouples the first common wiring 52 to or from the pixel signal wiring 50, and the switching circuit 210 (second switching circuit) that electrically couples or uncouples the first common wiring 52 to or from the detection electrode wiring 51.

In the above-described configuration, the pixel signal Vpix is transmitted to the first common wiring 52 in the display period Pd, and the detection input/output signal AFE is transmitted to the first common wiring 52 in the detection period Pt. The switching circuit 220 (first switching circuit) applies the pixel signal Vpix to the pixel signal wiring 50 in the display period Pd. The switching circuit 210 (second switching circuit) applies the detection input/output signal AFE to the detection electrode wiring 51 in the detection period Pt.

The display device 1e according to the third embodiment includes the second common wiring 53 that transmits the display drive signal VCOM to be supplied to the detection electrode DE. The switching circuit 210 (second switching circuit) electrically couples or uncouples the second common wiring 53 to or from the detection electrode DE, and applies the display drive signal VCOM to the detection electrode wiring 51 in the display period Pd.

In the above-described configuration, the detection input/output signal AFE or the guard signal Vgd is transmitted to the first common wiring 52 in the detection period Pt. The switching circuit 210 (second switching circuit) applies the detection input/output signal AFE or the guard signal Vgd to the detection electrode wiring 51 in the detection period Pt.

The display device 1e according to the third embodiment can transmit, through the first common wiring 52, both the pixel signal Vpix to be supplied to the pixel Pix and the detection input/output signal AFE to be supplied to the detection electrode DE. This configuration can reduce the number of lines of the wiring coupled to the display panel 10, and can reduce the width of the peripheral region 18 outside the display region 20 and the width of the coupling portion between the display panel 10 and the circuit board 16.

The present embodiment can provide the display device 1e that can reduce the number of lines of the wiring coupled to the display panel 10.

In the above-described embodiments, the examples have been described in which the present disclosure is applied to the aspect of detecting the position of the detection target object on the detection surface of the sensing region 30. However, the present disclosure can be applied to an aspect of detecting a force applied to the sensing region 30 by the detection target object.

The components of the embodiments described above can be combined as appropriate. Other operational advantages accruing from the aspects described in the embodiments of the present disclosure that are obvious from the description herein, or that are conceivable as appropriate by those skilled in the art will naturally be understood as accruing from the embodiments of the present disclosure.

What is claimed is:

1. A display device comprising a driver integrated circuit (IC) and a display panel that is provided with a display region including a plurality of pixels and with a plurality of detection electrodes, wherein
the display panel comprises:
a first common wiring line configured to transmit pixel signals to be supplied to the pixels and a detection input/output signal to be supplied to a first detection electrode that is one of the detection electrodes;
a pixel signal wiring line electrically coupled to the pixels;
a detection electrode wiring line electrically coupled to the first detection electrode;
a first switching circuit configured to electrically couple or uncouple the first common wiring line to or from the pixel signal wiring line; and
a second switching circuit configured to electrically couple or uncouple the first common wiring line to or from the detection electrode wiring line,
each of the first switch circuit and the second switch circuit is formed on a peripheral region outside of the display region and outside of the driver IC,
the first common wiring line has a configuration in which one line branches into two,
the first common wiring line leas a first end, a second end, and a third end,
the first end is coupled to the first switching circuit,
the second end is coupled to the second switching circuit, and
the third end is coupled to the driver IC.

2. The display device according to claim 1, wherein
the first common wiring line is configured to transmit the pixel signals in a display period, and transmit the detection input/output signal in a detection period different from the display period,
the first switching circuit is configured to apply the pixel signals to the pixel signal wiring line in the display period, and
the second switching circuit is configured to apply the detection input/output signal to the detection electrode wiring line in the detection period.

3. The display device according to claim 2, further comprising a second common wiring line configured to transmit a display drive signal to be supplied to the first detection electrode, wherein
one end of the second common wiring line is coupled to the driver IC,
another end of the second common wiring line is coupled to the second switch circuit,
the second switching circuit is configured to electrically couple or uncouple the second common wiring line to or from the detection electrode wiring line, and apply the display drive signal to the detection electrode wiring line in the display period.

4. The display device according to claim 3, wherein
the first common wiring line is configured to transmit the detection input/output signal or a guard signal synchronized with the detection input/output signal in the detection period, and
the second switching circuit is configured to apply the detection input/output signal or the guard signal to the detection electrode wiring line in the detection period.

5. The display device according to claim 4, wherein
the second common wiring line is configured to transmit the display drive signal in the display period, and transmit the guard signal in the detection period.

6. The display device according to claim 2, further comprising a second common wiring line configured to transmit a display drive signal to be supplied to the first detection electrode or a guard signal synchronized with the detection input/output signal, wherein
the second common wiring line is configured to transmit the display drive signal in the display period, and transmit the guard signal in the detection period, and
the second switching circuit is configured to electrically couple or uncouple the second common wiring line to or from the detection electrode wiring line to apply the display drive signal to the detection electrode wiring line in the display period and apply the detection input/output signal or the guard signal to the detection electrode wiring line in the detection period.

7. The display device according to claim 4, wherein the display panel comprises, in the peripheral region outside the display region, outer frame wiring electrically coupled to the second common wiring line, and further comprises a third switching circuit configured to couple or uncouple the outer frame wiring to or from the pixel signal wiring line, and the third switching circuit is configured to apply the guard signal to the pixel signal wiring line in the detection period.

8. The display device according to claim 5, wherein the display panel comprises, in the peripheral region outside the display region, outer frame wiring electrically coupled to the second common wiring line, and further comprises a third switching circuit configured to couple or uncouple the outer frame wiring to or from the pixel signal wiring line, and the third switching circuit is configured to apply the guard signal to the pixel signal wiring line in the detection period.

9. The display device according to claim 6, wherein the display panel comprises, in the peripheral region outside the display region, outer frame wiring electrically coupled to the second common wiring line, and further comprises a third switching circuit configured to couple or uncouple the outer frame wiring to or from the pixel signal wiring line, and the third switching circuit is configured to apply the guard signal the pixel signal wiring line in the detection period.

* * * * *